United States Patent [19]
Kishigami et al.

[11] Patent Number: 5,633,898
[45] Date of Patent: May 27, 1997

[54] AUTOMATIC FREQUENCY CONTROL APPARATUS FOR FSK RECEIVER AND FSK RECEIVER INCLUDING THE SAME

[75] Inventors: Takaaki Kishigami; Katsuaki Abe, both of Kawasaki; Masahiro Mimura; Makoto Hasegawa, both of Tokyo; Katsushi Yokozaki, Yokohama, all of Japan

[73] Assignee: Matsushita Electric Industrial Co., Ltd., Japan

[21] Appl. No.: 360,648

[22] Filed: Dec. 21, 1994

[30] Foreign Application Priority Data

Dec. 22, 1993 [JP] Japan .................................. 5-325068
Oct. 4, 1994 [JP] Japan .................................. 6-240065

[51] Int. Cl.$^6$ .......................... H04L 27/14; H04L 27/10; H04L 27/06; H03D 3/18
[52] U.S. Cl. .......................... 375/344; 375/326; 375/327; 375/328; 375/272; 329/300; 329/302; 329/306; 329/307; 455/182.2; 455/196.1; 455/258
[58] Field of Search .................................. 375/326, 327, 375/328, 334, 344, 272; 329/300, 302, 304, 306, 307; 455/182.1, 182.2, 192.1, 192.2, 192.3, 196.1, 258, 264

[56] References Cited

U.S. PATENT DOCUMENTS

| | | | |
|---|---|---|---|
| 4,103,244 | 7/1978 | Tan ............................. | 375/326 |
| 4,485,347 | 11/1984 | Hirasawa ..................... | 375/328 |
| 4,486,715 | 12/1984 | Maas .......................... | 375/328 |
| 5,208,835 | 5/1993 | Weeks ........................ | 375/272 |
| 5,309,113 | 5/1994 | Mimura ...................... | 375/334 |

FOREIGN PATENT DOCUMENTS

| | | |
|---|---|---|
| 0599409 | 6/1994 | European Pat. Off. . |
| 55-14701 | 2/1980 | Japan . |
| 58-19038 | 2/1983 | Japan . |
| 2-60263 | 2/1990 | Japan . |
| 4-45636 | 2/1992 | Japan . |
| 2101821 | 1/1983 | United Kingdom . |

*Primary Examiner*—Wellington Chin
*Assistant Examiner*—Vijay Shankar
*Attorney, Agent, or Firm*—Rossi & Associates

[57] ABSTRACT

A first AFC apparatus receives and detects I and Q signals from a received first FSK signal with a local osc signal; demodulates the I and Q signals; F/V-converts I or/and Q signals into a voltage; compares it with a reference; and detects a frequency deviation direction of the local osc signal from the carrier signal according to the results of comparing and the demodulating. The local osc frequency is controlled by a given amount according to the result of the frequency deviation direction detection. A second AFC apparatus receives and detects I and Q signals using a first osc signal; FSK-modulates the I and Q signals with a second local osc signal having a lower frequency than the first local osc signal; and compares the frequency of the second FSK signal and the second local osc signal to supply a demodulation result. A frequency control for the first local osc signal is obtained by an averaging circuit averaging the modulation result. The F/V converter used in this apparatus has various modification and amplitude limiter may be provided as necessary. The averaging may be effected for a given data period of the first FSK signal. Power consumption can be reduced by selectively supplying a power with/without a holing circuit. FSK receivers use these automatic frequency control apparatus are also disclosed.

31 Claims, 18 Drawing Sheets

AUTOMATIC FREQUENCY CONTROL APPARATUS FOR FSK RECEIVER AND FSK RECEIVER INCLUDING THE SAME

BACKGROUND OF THE INVENTION

1. Field of the Invention

This invention relates to an automatic frequency control apparatus for an FSK receiver and FSK receiver including the same.

2. Description of the Prior Art

An automatic frequency control apparatus for an FSK receiver is known. In a direct conversion FSK receiver, if there is a difference between a carrier frequency and a local oscillation frequency, a sensitivity will decrease because one intermediate frequency after quadrature conversion will increase but the other intermediate frequency after the quadrature conversion will decrease. Accordingly, an error rate in the data demodulation on the decreased intermediate frequency side increases. Therefore, in such a direct conversion FSK receiver, a prior art automatic frequency control (AFC) apparatus is used. Such a prior art automatic frequency control (AFC) apparatus is disclosed in Japanese patent application provisional publication No. 4-45636.

FIG. 19 is a block diagram of a prior art automatic frequency control apparatus. FIG. 20 shows waveforms of signals at respective points of the prior art automatic frequency control apparatus.

A received FSK signal derived from the frequency shift keying modulation with a binary digital signal indicative of a mark or space is inputted into an input terminal 101 and is amplified by an amplifier 102. An output of the amplifier 102 is supplied to mixers 103 and 104. A voltage controlled oscillator (VCO) 105 generates and supplies a local oscillation signal to the mixer 103 and to a 90°-degree phase shifter 106. The 90°-degree phase shifter 106 shifts the local oscillation signal by 90° degrees and supplies the phase shifted local oscillation signal to the mixer 104. Lowpass filters 107 and 108 limit passbands of the outputs of the mixers 103 and 104 respectively to provide an in-phase base band signal (I signal) and a quadrature base band signal (Q signal) respectively. A modulation circuit 801 effects demodulation with these I and Q signals to provide a demodulated output 808.

A limiter circuit 802 limits an amplitude of the Q (I) signal as shown by a waveform 152. An edge detection circuit 803 detects an edge in the output of the limiter circuit 802 as shown by a waveform 153. A pulse generation circuit 804 generates a pulse having a constant duration in response to an output of the edge detection circuit 803 as shown by a waveform 154. An integrating circuit 805 integrates the pulses from the pulse generation circuit 804 to provide a frequency to voltage conversion (F/V conversion) of the base band signal as shown by a waveform 155. The result of the F/V conversion is averaged by a mean value circuit 806 to provide a voltage VD corresponding to a frequency shift FD. If there is a difference between the carrier frequency of the received FSK signal and the oscillation frequency of the local oscillation circuit 105, an output of the integrating circuit varies around the mean vale VD between when the data represents a mark and when the data represents a space as shown by waveform 155. Therefore, a control circuit 807 controls the voltage controlled oscillator 105 such that the output of the integrating circuit 805 approximately equal to the mean value VD to provide an automatic frequency control.

In the FSK signal transmission system, a high speed and multi-value transmission and decreasing a bandwidth per channel are required. That is, a modulation index of the FSK signal is required to be low.

If the FSK receiver as shown in FIG. 19 receives an FSK signal having a modulation index less than 1, the number of edges for one data interval of the I and Q base band signals becomes small. Then, there is a possibility that an edge may be disappear for one data interval of either of mark or space data if there is a difference between the carrier frequency of the FSK signal and the local frequency signal of the voltage controlled oscillator 105. Therefore, an error in the means value circuit 806 may occur, so that the automatic frequency controlling operation may be incorrectly.

FIG. 21 is a spectrum diagram of the prior art showing a spectrum of a four-value FSK signal. If the FSK receiver shown in FIG. 19 receives an FSK signal having four values, the AFC cannot operate correctly because the output voltage of the integrator 805 varies between when the frequency shift frequency is $\Delta F$ and when it is $3 \Delta F$ though the carrier frequency approximately equal to the frequency of voltage controlled oscillator 105.

Further, there are needs for a simple structure and a low power consumption if the FSK receiver is employed as a portable receiver such as a pager.

In such portable receiver, the receiver is intermittently operated. The whole circuits of the receiver is supplied with a supply power only when a synchronizing signal is transmitted for providing a synchronization with a base station and when the FSK signal is transmitted toward the group to which that receiver belongs but a clock circuit should be constantly supplied with the supply power.

SUMMARY OF THE INVENTION

The aim of the present invention is to provide an improved automatic frequency control apparatus for an FSK receiver and an improved FSK receiver including the same.

According to the present invention there is provided a first automatic frequency controlling circuit for a frequency shift keying receiver having a receiving and detection circuit for receiving and detecting in-phase and quadrature signals using a frequency controlled local oscillation signal from a received frequency shift keying signal, a demodulater for demodulating the in-phase and quadrature signals and outputting mark and space data, and an intermittent signal circuit for generating an intermittent signal for an intermittent receiving operation of the frequency shift keying receiver, the automatic frequency controlling circuit comprising: a local oscillator for generating the frequency controlled local oscillation signal; a frequency to voltage converter for converting at least one signal of the in-phase and quadrature signals to a voltage signal; a voltage comparator for comparing the voltage signal with a reference voltage; a frequency deviation direction detection circuit for detecting whether the frequency deviation of the frequency controlled local oscillation signal from a carrier frequency of the received frequency shift keying signal upwardly or downwardly in accordance with a result of the demodulation circuit and an output of the voltage comparator to obtain a frequency deviation direction detection result; a holding circuit for holding the frequency deviation direction detection result; a frequency change control signal generation circuit for generating a frequency change control signal in response to the intermittent signal; and a frequency control signal generation circuit responsive to the frequency change control signal for generating the frequency control signal in accordance with an output of the holding circuit such that a frequency of the local oscillation signal is controlled toward the carrier frequency by a predetermined amount.

In the first automatic frequency controlling circuit, the frequency control signal generation circuit generates the frequency control signal such that the frequency is changed by the predetermined amount downwardly when the frequency deviation direction detection circuit detects that the frequency deviation is upward and upwardly when the frequency deviation direction detection circuit detects that the frequency deviation is downward.

In the first automatic frequency controlling circuit, the holding circuit at least holds the output of the frequency deviation direction detection circuit until the frequency control signal generation circuit generates the frequency control signal.

In the first automatic frequency controlling circuit, may further comprise a mixing circuit for mixing the in-phase signal and quadrature signal and for supplying the one signal to the frequency to voltage comparator.

In the first automatic frequency controlling circuit, the frequency control signal generation circuit generates the frequency control signal such that the frequency is changed by the predetermined amount which is less than 2|fs−fd| wherein fs is a frequency of the one signal corresponding to the reference voltage and the fd is a frequency shift of the frequency shift keying signal.

In the first automatic frequency controlling circuit, the frequency change control circuit may generate the frequency control signal just after the intermittent receiving operation in response to the intermittent signal.

The first automatic frequency controlling circuit may further comprise a power supply control circuit responsive to the intermittent signal and an output of the frequency deviation direction detection circuit for controlling a power supply to the frequency deviation detection circuit from when the output of the frequency deviation direction detection circuit is supplied to the power supply control circuit to the next intermittent receiving operation.

In the first automatic frequency controlling circuit may further comprise a calling detection circuit for detecting a calling; i.e., identifying data, to this frequency shift keying receiver from the mark and space data and a power supply control circuit responsive to the intermittent signal and an output of the calling detection circuit for supplying a power supply used for the automatic frequency controlling circuit during the intermittent receiving operation when the calling is to this frequency shift keying receiver.

The first automatic frequency controlling circuit may further comprise a detection circuit for detecting whether or not the number of the intermittent receiving operation reaches a predetermined number and a power supply control circuit responsive to an output of the detection circuit for supplying a power supply used for the automatic frequency controlling circuit every time the number of the intermittent receiving operation reaches the predetermined number.

In the first automatic frequency controlling circuit, the local oscillator may comprise a phase synchronizing loop oscillation circuit, having a reference frequency signal generation circuit, for generating the local oscillation signal, the frequency of the local oscillation signal being controlled in accordance with the reference frequency signal which is controlled by the frequency control signal.

In the first automatic frequency controlling circuit, the local oscillator may comprise a crystal oscillator for generating the local oscillation signal, the frequency of the local oscillation signal being controlled in accordance with the frequency control signal.

The first automatic frequency controlling circuit may further comprise a second voltage comparator for comparing the voltage signal with a second reference voltage which is different from the reference voltage, wherein the frequency deviation direction detection circuit further detects an amount of the frequency deviation of the frequency controlled local oscillation signal from the carrier frequency and the holding circuit further holds a detected amount of the frequency deviation and the frequency control signal generation circuit generates the frequency control signal in accordance with the frequency deviation direction detection result and the detected amount of the frequency deviation.

According to the present invention there is provided a frequency shift keying signal receiver with automatic frequency controlling, having a receiving and detection circuit for receiving and detecting an in-phase and quadrature signals using a local oscillation signal from a received first frequency shift keying signal having a data rate, for outputting a demodulated result, the frequency shift keying receiver comprising: a local oscillator for generating the local oscillation signal, a frequency of the local signal being controlled in accordance with a frequency control signal; a frequency shift keying modulation circuit for generating a frequency signal and a second frequency shift keying modulation signal by frequency shift modulating the in-phase and quadrature signals using the frequency signal having a substantially predetermined frequency lower than a carrier frequency of the first frequency shift keying signal; a first frequency to voltage converter for converting a frequency of the second frequency shift keying signal into a first voltage signal; a second frequency to voltage converter for converting the predetermined frequency of the frequency signal into a second voltage signal; a voltage comparing circuit for comparing first and second voltage signals and outputting the demodulation result; and an averaging circuit for averaging the demodulation result successively outputted for a predetermined interval which is sufficiently long compared with the data rate and for generating the frequency control signal.

In the frequency shift keying signal receiver, the frequency shift keying modulation circuit comprises: a second local oscillator for generating and outputting the frequency signal; a phase shifter for phase sifting the frequency signal by 90°; a first mixer for mixing the in-phase baseband signal with an output of the phase shifter; a second mixer for mixing the quadrature baseband signal with the frequency signal; and a subtractor for generating and outputting the second frequency shift keying signal by effecting subtraction between outputs of the first and second mixers. Moreover, in this frequency shift keying signal receiver, the second local oscillator may have a digital oscillator for generating a digital frequency signal having a second substantially predetermined frequency twice the substantially predetermined frequency of the frequency signal and a ½-frequency divider for ½-frequency dividing the digital frequency signal and the phase shifter may have an Exclusive OR circuit for effecting Exclusive OR operation between the digital frequency signal and an output of the ½-frequency divider, the output of the Exclusive OR circuit being supplied to the first mixer and the output of the ½-frequency divider being supplied to the second mixer. Moreover, in this receiver, the first mixer comprises: a first inverter for inverting the in-phase baseband signal; and a first switch for supplying either of the in-phase baseband signal or the inverted in-phase baseband signal to the subtractor in response to the output of the Exclusive OR circuit and the second mixer comprises: a second inverter for inverting the quadrature baseband signal; and a second switch for supplying either of the quadrature baseband signal or the inverted quadrature baseband signal to the subtractor in response to the output of the ½-frequency divider circuit.

In the frequency shift keying signal receiver, the frequency to voltage converter has various modifications for reducing the number of necessary parts and a manufacturing cost and power consumption. Particularly, a power consumption can be reduced by effecting the frequency control only when a predetermined data train including mark and space data alternately arranged is transmitted.

In the first frequency shift keying signal receiver, the second frequency shift keying signal may be filtered to obtain a necessary frequency component to supply it to the first frequency to voltage converter.

In the frequency shift keying signal receiver, one lowpass filter provided after the voltage comparing circuit may replace two lowpass filters in the first and second frequency to voltage converters.

In the frequency shift keying signal receiver, one of two frequency to voltage converters can be omitted by providing two switches and a holding circuit for holding the voltage signal.

The frequency shift keying signal receiver may further comprise a first limiter circuit for amplitude-limiting the in-phase signal and supplying amplitude-limited in-phase signal to the frequency shift modulation circuit and a second limiter circuit for amplitude-limiting the quadrature signal and supplying amplitude-limited quadrature signal to the frequency shift modulation circuit.

According to this invention there is provided a second automatic frequency controlling circuit for a frequency shift keying receiver having a receiving and detection circuit for receiving and detecting an in-phase and quadrature signals using a frequency controlled local oscillation signal from a received first frequency shift keying signal having a data rate, and a demodulator for demodulating the in-phase and quadrature baseband signals and outputting mark and space data, the automatic frequency controlling circuit comprising: a local oscillator for generating the frequency controlled local oscillation signal: a frequency shift keying modulation circuit for generating a frequency signal and a second frequency shift keying modulation signal by frequency shift modulating the in-phase and quadrature signals using the frequency signal having a predetermined frequency lower than a carrier frequency of the first frequency shift keying signal; a first frequency to voltage converter for converting a frequency of the second frequency shift keying signal into a first voltage signal; a second frequency to voltage converter for converting the predetermined frequency of the frequency signal into a second voltage signal; a voltage comparing circuit for comparing first and second voltage signals and outputting a demodulation result; an averaging circuit for averaging the demodulation result successively outputted for a predetermined interval which is sufficiently long compared with the data rate and for generating the frequency control signal.

BRIEF DESCRIPTION OF THE DRAWINGS

The objects and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Hereinbelow will be described a first embodiment of this invention.

Figure 1:
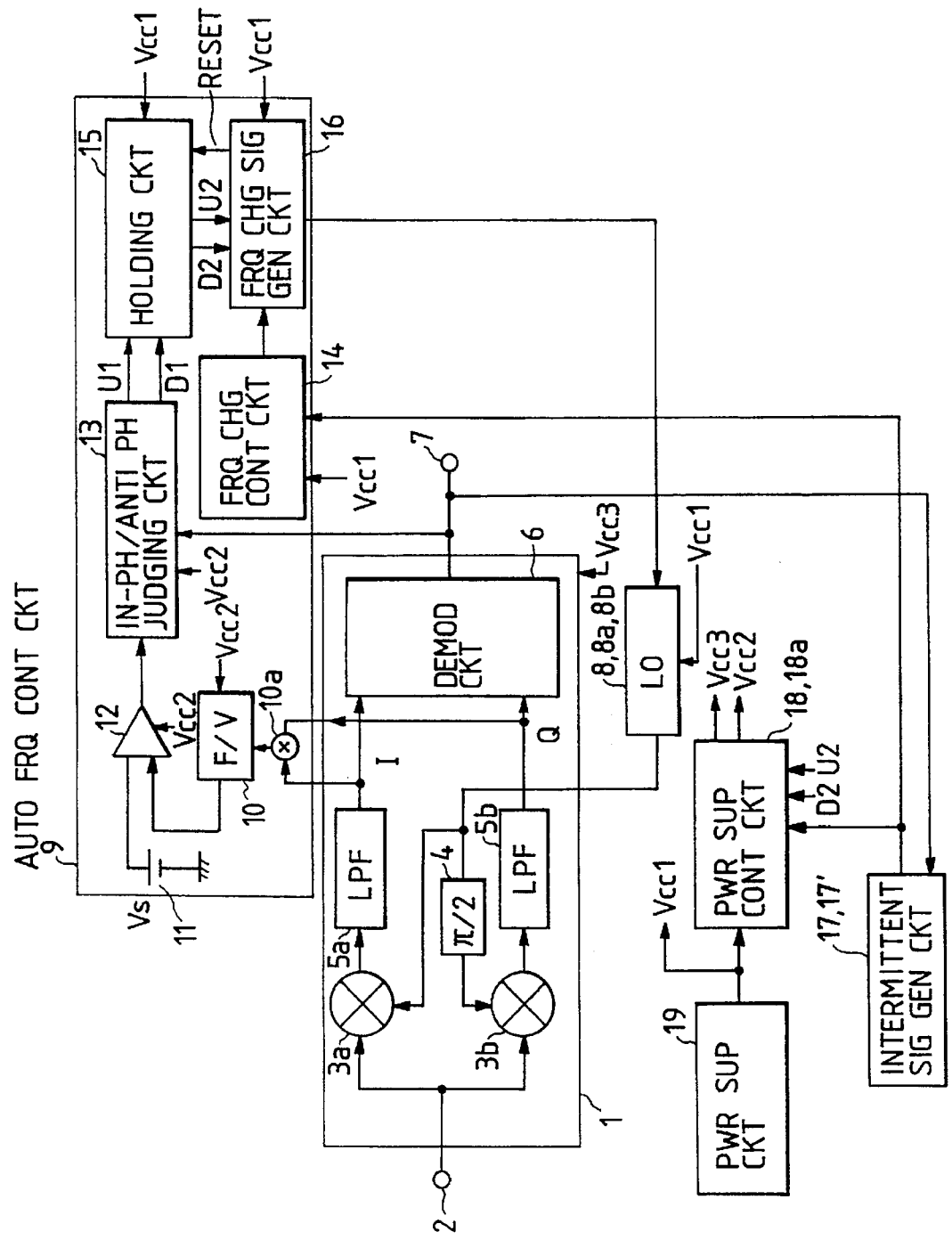
FIG. 1 is a block diagram of a first embodiment of an automatic frequency control apparatus used in an FSK receiver.

FIG. 1 is a block diagram of the first embodiment of an automatic frequency control apparatus used in an FSK receiver. The FSK receiver comprises a receiving and demodulation portion 1 for receiving an FSK signal via an input 2 and demodulating the received FSK signal, a local oscillator 8 of a voltage controlled oscillator (VCO) for generating a local oscillation signal, an automatic frequency control circuit 9 for generating a frequency control signal supplied to the local oscillator 8, an intermittent signal generation circuit 17 for generating a intermittent signal indicative of an operation timing, a power supply 19 for supplying a supply power Vcc1, a supply power control circuit 18 for supplying supply powers Vcc2 and Vcc3 from the supply power Vcc1 in response to the intermittent signal. The receiving and demodulation portion 1 comprises a phase shifter 4 for phase shifting the local oscillation signal by $\pi/2$ and a mixer 3a for mixing the received FSK signal with the local oscillation signal from the local oscillator 8 and a mixer 3b for mixing the received FSK signal with an output of the phase shifter 4, a low-pass filter 5a for low-pass filtering an output of the mixer 3a and outputting an in-phase signal, namely, I signal, a low-pass filter 5b for low-pass filtering an output of the mixer 3b and outputting an quadrature signal, namely, Q signal, and a demodulating circuit 6 for demodulating the received FSK signal using the I and Q signals.

The automatic frequency control circuit 9 comprises a frequency to voltage converter (F/V) 10, having a mixer 10a, for mixing the I signal with the Q signal to produce a mixed signal having a frequency twice that of the I and Q signals and for producing a voltage signal in accordance with the frequency of the mixed signal, a comparator 12 for comparing an output of the F/V converter 10 with a reference voltage Vs, an in-phase/antiphase judging circuit (frequency deviation direction detection circuit) 13 for producing a frequency-up signal U1 and a frequency-down signal D1 in accordance with the result of the comparator 12 and the decoding result of the decoding circuit 6, namely, a mark or a space, a holding circuit 15 for holding the frequency-up signal U1 and the frequency-down signal D1, a frequency change control signal generation circuit 14 for generating a frequency change control signal indicative of changing the local frequency in a high logic level condition, a frequency changing signal generation circuit 16 for generating a frequency changing signal when either of the frequency-up signal or the frequency-down signal from the holding circuit 15 is outputted in the presence of the frequency change control signal. The local oscillator 8 increases the local frequency by $\alpha f$ from the present local frequency when the frequency changing signal is indicative of increasing the local frequency and decreases the local frequency by $\Delta f$ from the present local frequency when the frequency changing signal is indicative of decreasing the local frequency.

An operation of the first embodiment will be described.

It is assumed that the carrier frequency of the received FSK signal is fc, the frequency shift is fd, a frequency of the received FSK signal when the received FSK signal indicates a mark is fc+fd, the frequency of the received FSK signal when the received FSK signal indicates a space is fc−fd, and the local oscillation frequency is fL.

The quadrature mixers 3a and 3b and low-pass filters 5a and 5b convert the received FSK signal from the input 2 into the in-phase signal (I signal) and the quadrature signal (Q signal). The I and Q signals are mixed by the mixer 10a to produce the mixed signal having a frequency twice the frequency of the I and Q signals. The frequency to voltage converting circuit 10 converts the mixed signal from the mixer 10a to a voltage signal proportional to the frequencies of the I and Q signals. The voltage comparator 12 compares the voltage signal Vo with the reference voltage Vs.

Figure 3:
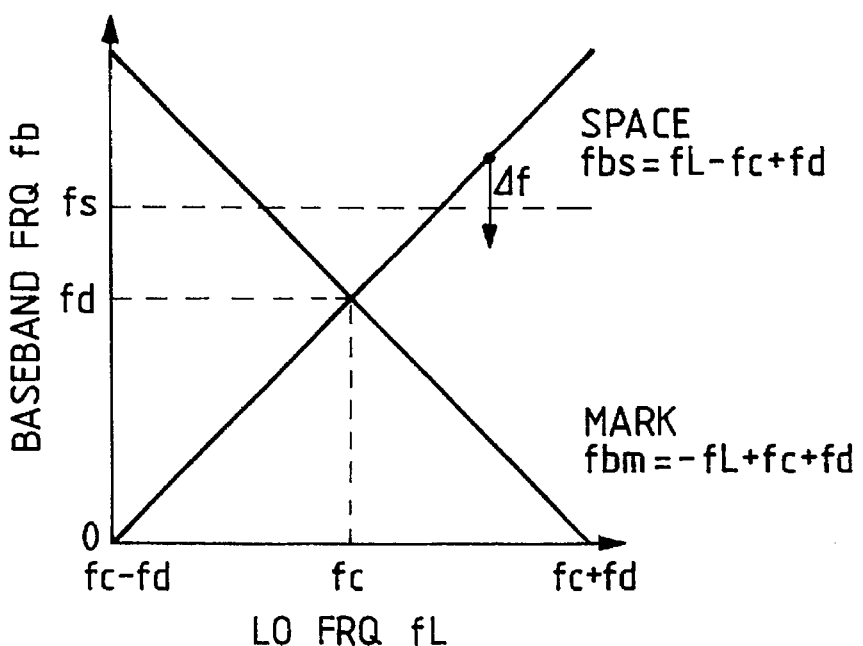
FIG. 3 is a graph of the first embodiment showing a a relation between the local oscillation frequency and the baseband frequency fb.

Assuming that the voltage of the voltage signal of the frequency to voltage converter 10 when a frequency of the baseband signal is equal to the frequency shift fd is Vd, the reference voltage is set to Vs which is slightly higher than the Vd. More specifically, Vs is higher than Vd and lower than a maximum allowed deviated frequency for the receiving and decoding circuit 1. The voltage comparator 12 outputs a high logic level if Vo>Vs. FIG. 3 is a graph of the first embodiment showing a frequency relation between the local oscillation frequency and the baseband signals. When a absolute value |fL−fc| is higher that the baseband frequency fs which makes the voltage signal Vo equal to the Vs. That is, voltage comparator 12 outputs the high logic level when fs<|fL−fc| and the low logic level when fs≧|fL−fc|.

In the condition that the output of the voltage comparator 12 is H logic level, the in-phase/antiphase judging circuit 13 outputs the frequency down signal D1, i.e., a H logic level, when the demodulated signal from the demodulation circuit 6 represents a space and outputs the frequency up signal U1, i.e., a high logic level, when the demodulated signal from the demodulation circuit 6 represents a mark. When the output of the voltage comparator 12 is a L logic level, the in-phase/antiphase judging circuit 13 outputs neither of the frequency down signal D1 and frequency up signal U1, i.e., outputs L logic levels at outputs thereof. The holding circuit 15 holds the outputs levels of the in-phase/antiphase judging circuit 13. The holding circuit 15 holds the outputs levels in response to changes in the levels of the frequency down signal D1 and frequency up signal U1 until the frequency change signal generation circuit 16 generates the frequency change signal. That is, the frequency change signal generation circuit 16 resets the holding circuit 15.

The in-phase/antiphase judging circuit 13 may output the frequency down signal D1 and the frequency up signal U1 in a coded form.

Figure 2A:
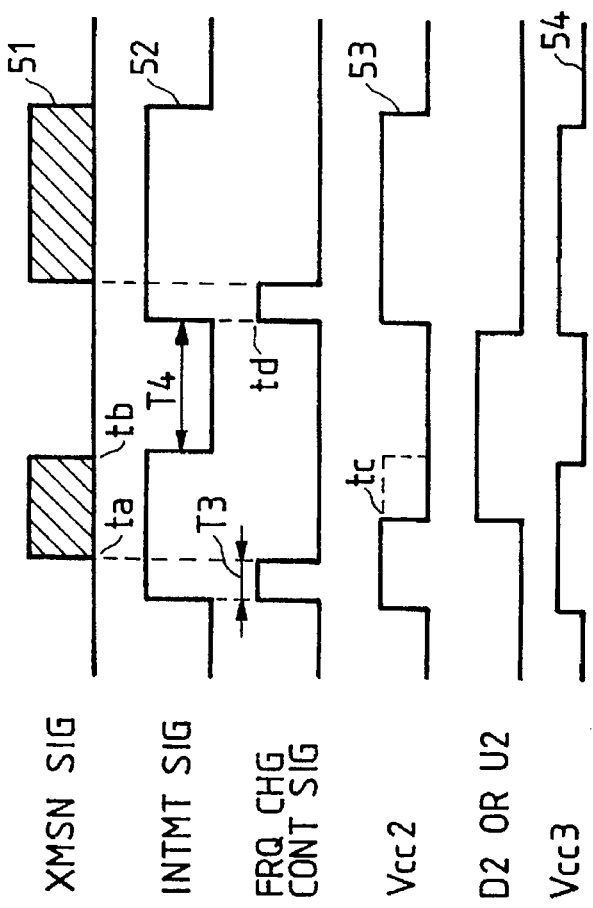
FIGS. 2A and 2B are timing charts of the first embodiment showing intermittent operation.
Figure 2B:
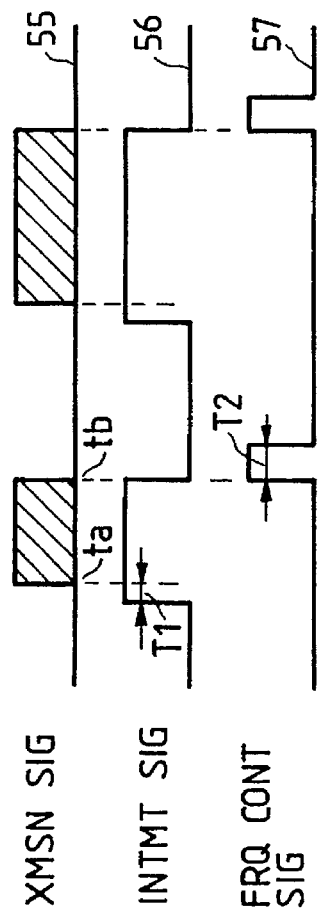

FIGS. 2A and 2B are timing charts of the first embodiment showing intermittent operation. The intermittent signal generation 17 produces the intermittent signal indicative of the operation timing, that is, supplies the intermittent signal to the power supply control circuit 18 and the frequency change signal generation circuit 14 periodically when the FSK receiver is in an intermittent operation mode. The power supply 17 produces a supply power Vcc1 and the power supply control circuit 18 supplies supply powers Vcc2 and Vcc3 from the supply power Vcc1 in response to the intermittent signal, the frequency down signal D2, and the frequency up signal U2. As shown in FIG. 2A, the power supply control circuit 18 supplies the supply powers Vcc2 and Vcc3 in response the intermittent signal, i.e., at timings ta–T3 to tb for example, but when the frequency down signal D2 or frequency up signal U2 is inputted to the power supply control circuit 18, the power supply control circuit 18 stops the supplying the supply power Vcc2 at tc until the next intermittent signal is received at td because once the frequency deviation to be corrected is detected, this detection is not necessary until the frequency control will have been done as shown by waveform 53. On the other hand, the supply power Vcc3 to the receiving and demodulation circuit 1 is supplied from timings ta–T3 to tb, for example, as shown by waveform 54.

The frequency to voltage converter 10, the voltage comparator 12, and the in-phase/antiphase judging circuit 13 are supplied with the supply power Vcc2 and the other circuits except the receiving and demodulation portion 1 supplied with Vcc3 are supplied with the supply power Vcc1.

The frequency change control signal generation circuit 14 generates the frequency change control signal in response to the intermittent signal. In the intermittent operation mode, the frequency change control signal generation circuit 14 supplies the frequency change control signal just before the intermittent operation period as shown in FIG. 2A or just after the intermittent operation period as shown in FIG. 2B. The intermittent operation period is a period for which this FSK receiver receives the synchronizing signal from the base station or communicates with other transmitter to which this FSK receiver belongs. The intermittent signal generation circuit 17 generates the intermittent signal at a predetermined interval. However, in the initial condition, the intermittent signal generation circuit 17 monitors the received data continuously and once the intermittent signal generation circuit 17 obtains the intermittent timing and a recurrent interval, it generates the intermittent signal every the predetermined interval.

In FIGS. 2A and 2B, an interval T1 is an interval necessary for the receive and demodulation portion 1 to become stable after supplying of the supply power Vcc3, an interval T2 is an interval necessary to change the frequency of the local oscillator 8 in response to the frequency change signal, and an interval T3 necessary for the receive and demodulation portion 1 to become stable and for change the frequency of the local oscillator 8 in response to the frequency change signal.

FIG. 2A shows a first example of intermittent operation. That is, the local oscillation frequency is controlled for the interval T3 just before the intermittent receiving operation. More specifically, if the data to be received is transmitted from the timings ta to a timing tb, the intermittent signal is generated from a timing ta−T3 to the timing tb and the frequency change control signal is generated from the timing ta−T3 to the timing ta. For the interval T4, the F/V converter 10, the voltage comparator 12, and the in-phase/antiphase judging circuit, and the receiving and decoding circuit 1 are not supplied with the supply power Vcc2 in the sleep mode.

FIG. 2B shows a second example of intermittent operation. That is, the local oscillation frequency is controlled for the interval T2 just after the intermittent operation. More specifically, if the data to be received is transmitted from the timings ta to a timing tb, the intermittent signal is generated from the timing t1 to the timing tb and the frequency change control signal is generated from the timing tb to the timing tb+T2.

The frequency change signal generation circuit 16 generates the frequency change signal in response to the frequency change control signal in accordance with the output signals of the holding circuit iS to change the local oscillation frequency of the local oscillator 8 by a predetermined frequency Δf. That is, when the frequency-up signal U2 is supplied to the frequency change signal generation circuit 16, the frequency change signal generation circuit 16 supplies the frequency change signal indicative of increasing the local oscillation frequency to the local oscillator 8 in the presence of the frequency change control signal. The local oscillator 8 increases the local oscillation frequency by Δf from the present local oscillation frequency and holds the local oscillation frequency until it receives a next frequency change signal. When the frequency-down signal D2 is supplied to the frequency change signal generation circuit 16, the frequency change signal generation circuit 16 supplies the frequency change signal indicative of decreasing the local oscillation frequency to the local oscillator 8 by the predetermined frequency Δf in the presence of the frequency change control signal. The local oscillator 8 decreases the local oscillation frequency by Δf from the present local oscillation frequency and holds the local oscillation frequency until it receives a next frequency change signal. The frequency change signal generation circuit 16 does not supply the frequency change signal when both frequency-up signal U2 and the frequency-down signal D2 are absent though the frequency control signal is present.

As mentioned above, in the FSK receiver effecting an intermittent operation, the local oscillation frequency is accurately adjusted to the carrier frequency to provide a stable receiving of data by changing the local oscillation frequency of the local oscillator 8 just before or just after the intermittent receiving operation.

The predetermined frequency $\Delta f \leq 2|fs-fd|$ if the reference frequency fs is set within the tolerance range of the local oscillation frequency to converge the frequency deviation to the target frequency. In other words, if $\Delta f > 2|fs-fd|$ the frequency deviation will increase, so that the AFC operation will diverge. The frequency deviation of the local oscillation frequency from the carrier frequency is suppressed by setting Δf to about 2|fs−fd|, so that the local frequency can be adjusted by a fewer times of controlling of the local oscillation frequency of the local oscillator 8. Moreover, if there is a conversion error in the frequency to voltage converter 10, this automatic frequency controlling is subjected to the effect by the conversion error to a lower extent because the local frequency is controlled within the allowable frequency range by changing the local oscillation frequency by a predetermined Δf.

Moreover, the power consumption in the automatic frequency control circuit 9 and the receiving and decoding circuit 1 can be reduced by intermittently supplying the supply powers Vcc2 and Vcc3 in response to the intermittent signal. Moreover, the supply voltage Vcc2 is not supplied from the timing tc when the frequency down signal D2 or the frequency up signal U2 is generated to the next intermittent operation at timing td, so that the reduction of the power consumption is promoted further.

The local oscillator 8 may comprise a phase synchronizing loop oscillation circuit 8a. In that case, the frequency changing signal generation circuit 16 can change the local frequency by a predetermined value by changing the reference frequency of the phase synchronizing loop circuit 8a by a given value.

The local oscillator 8 may comprise a crystal oscillation circuit 8b. In that case, the frequency changing signal generation circuit 18 can change the local frequency by a predetermined value by changing the oscillation frequency of the crystal oscillation circuit by the given value.

Figure 4A:
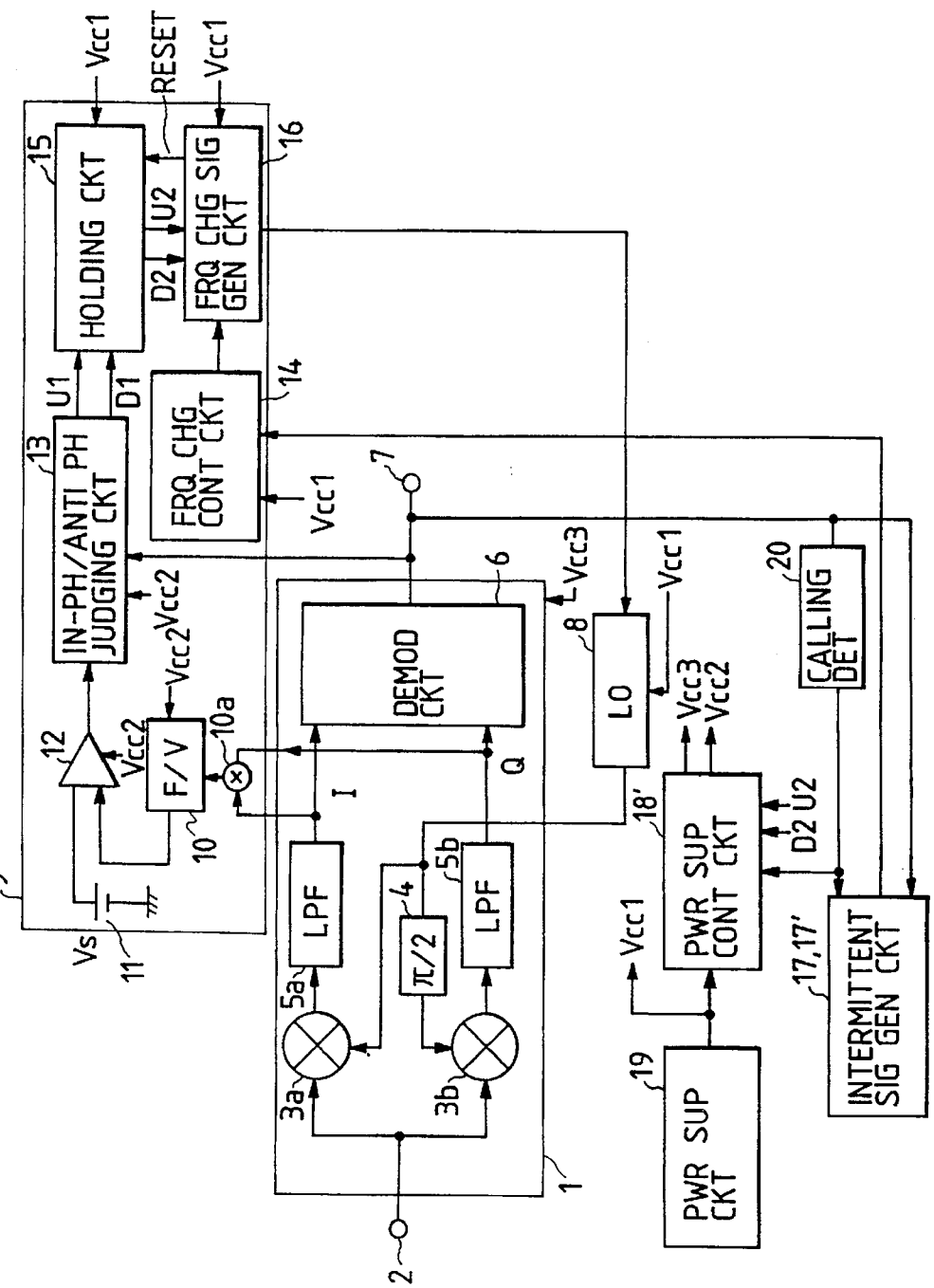
FIG. 4A is a block diagram of a second embodiment of an automatic frequency control apparatus used in an FSK receiver.

FIG. 4A is a block diagram of a second embodiment. The automatic frequency control circuit of this embodiment has essentially the same structure as the first embodiment. The difference between this embodiment and the first embodiment is that a calling detecting circuit 20 is added to detect a calling to this FSK receiver in response to the output of the demodulation circuit 6 and the intermittent signal generation circuit 17' replaces the intermittent signal generation circuit 17 to supply a second intermittent signal in response to the output of the demodulation circuit 6 and the output of the calling detection circuit 20. The power supply control circuit 18 supplies the supply power Vcc2 in response to the calling detection circuit 20. The calling detection circuit 20 detects a selective calling, i.e., identifying data, to this FSK receiver by monitoring the output of the demodulation circuit 6 to control the supplying of the supply power Vcc2 to save the power consumption.

Figure 4B:
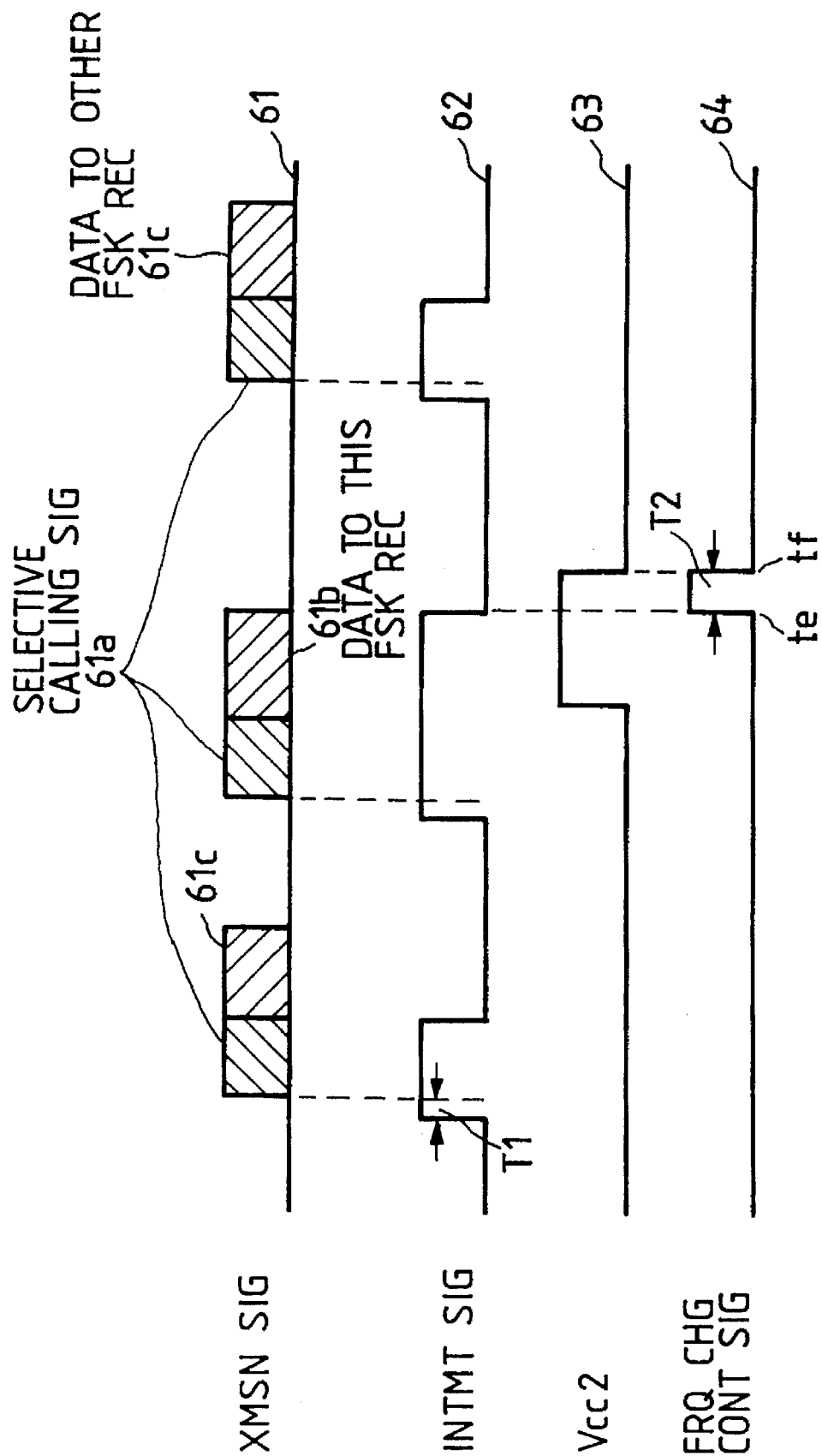
FIG. 4B is a timing chart of the second embodiment showing intermittent operation and the controlling of the supply power.

FIG. 4B is a timing chart of the second embodiment showing intermittent operation and the controlling of the supply power Vcc2. A transmitted FSK signal includes a selective calling signal 61a and data 61b or 61c as shown by a waveform 61. The calling detection circuit 20 detects the selective calling signal 61a and judges whether or not the data 61b following the selective calling signal is transmitted toward this FSK receiver. If the data 61b is transmitted toward this FSK receiver, the calling detection circuit 20 causes the power supply control circuit 18 to supply the supply power Vcc2 to control the local oscillation frequency. Therefore, the automatic frequency control circuit 9 is supplied with the supply power Vcc2 only when the data 61b is transmitted toward this FSK receiver. The supply power Vcc2 is supplied during the transmission of the data 61b toward this FSK receiver and the interval T2 necessary for controlling of the oscillation frequency. The frequency change control circuit 14 generates the frequency change control signal from a timing te to a timing tf as shown by a waveform 64. Therefore, during the receiving of the data 61b toward this FSK receiver, the frequency difference between the carrier signal of the transmitted FSK signal and the local oscillation signal is detected and the controlling of the local oscillation signal is effected during the interval T2.

According to this operation of the second embodiment, the power consumption in the automatic frequency control circuit 9 can be reduced considerably.

In this embodiment, the controlling of the local oscillation frequency is effected just after the receiving of the data 61b toward this FSK receiver. However, this controlling of the local oscillation frequency can be effected just before the intermittent operation following the intermittent operation in which the frequency difference between the carrier frequency and the local oscillation frequency has been detected.

This intermittent frequency controlling operation of the automatic frequency control circuit 9 is an example and other intermittent frequency controlling operation of the automatic frequency control circuit 9 can be considered. For example, the controlling of the supply power Vcc2 to the automatic frequency control circuit 9 may be effected at every several times intermittent operations of the FSK receiver to save the power consumption.

Figure 5:
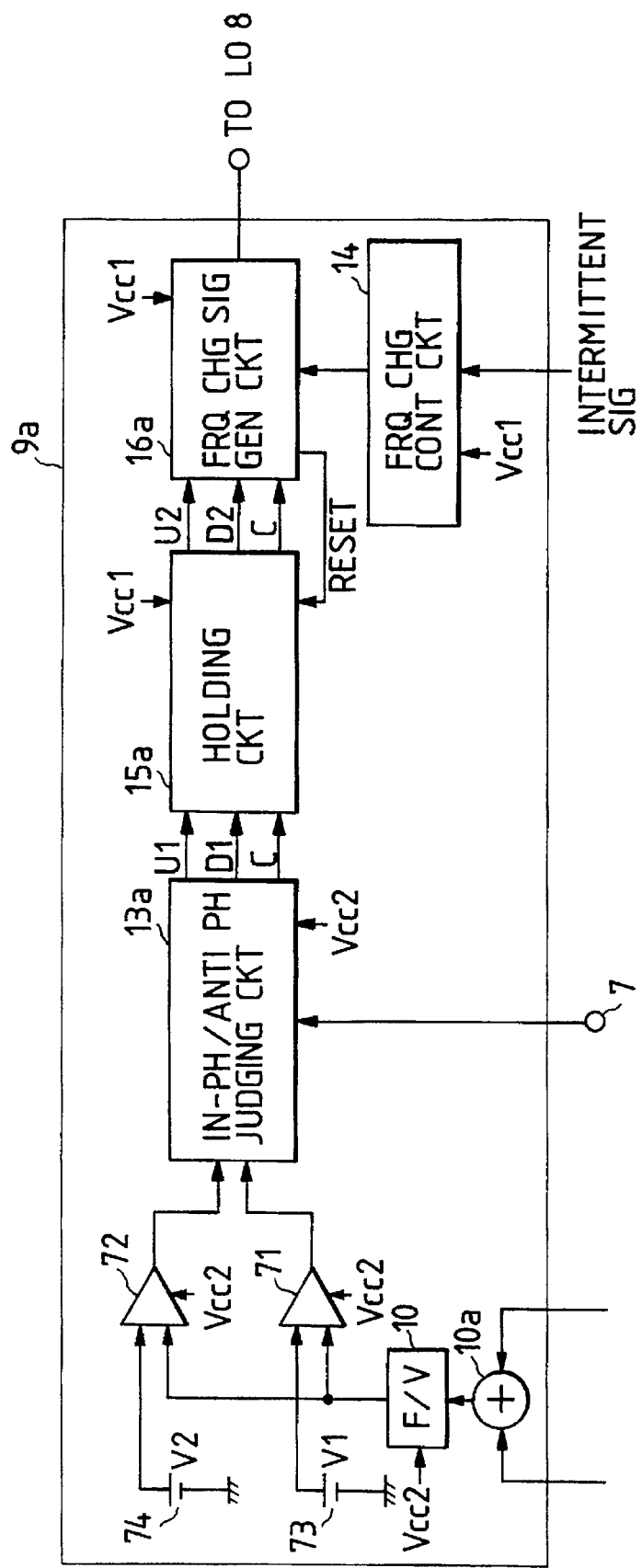
FIG. 5 is a block diagram of a third embodiment of an automatic frequency control circuit included in the FSK receiver.

FIG. 5 is a block diagram of a third embodiment of an automatic frequency control circuit included in the FSK receiver. The structure of the FSK receiver of this embodiment is the same as the first and second embodiments except this automatic frequency control circuit 9a. However, the basic structure of this frequency control. circuit 9a is similar to the first and second embodiment. The difference in the automatic frequency control circuit 9a will be described. The automatic frequency control circuit 9a comprises first and second comparators 71 and 72 and first and second reference voltage supplies 73 and 74. An in-phase/antiphase judging circuit (frequency deviation direction detection circuit) 13a, a holding circuit 15a, and a frequency change signal generation circuit 16a replace the in-phase/antiphase judging circuit 13, the holding circuit is, and the frequency change signal generation circuit 16 respectively.

The reference voltage supplies 73 and 74 supply reference voltages V1 and V2 respectively wherein V2>V1. The reference voltages V1 and V2 correspond the frequencies f1 and f2 of the I or Q signal.

Figure 6:
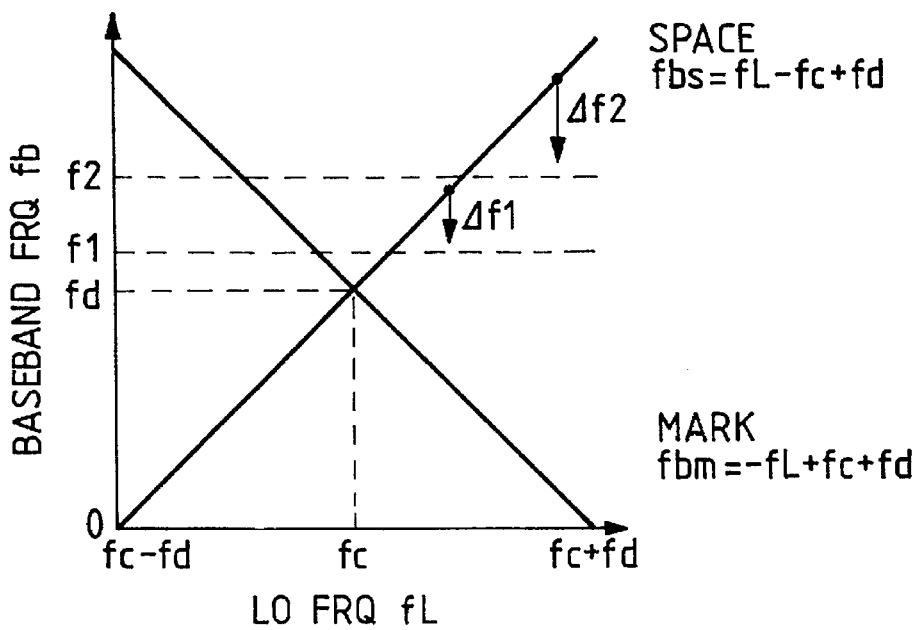
FIG. 6 is a graph of the third embodiment showing a relation between the local oscillation frequency and the frequency of the I or Q signal, i.e., the baseband frequency fb.

FIG. 6 is a graph of the third embodiment showing a relation between the local oscillation frequency and the is frequency of the I or Q signal, i.e., the baseband frequency fb.

When |fL|fc|>f2, both voltage comparators 71 and 72 outputs logic H levels and the in-phase/antiphase judging circuit 13a 13a outputs a logic H level of a change amount signal C, a logic H level of the frequency down signal D1 when the transmitted data indicates a space, and a logic H level of the frequency up signal U1 when the transmitted data indicates a mark. When f1<|fL−fc|≦f2, only the voltage comparator 71 outputs the logic H level and the in-phase/antiphase judging circuit 13a makes the change amount signal C a logic L level and outputs a logic H level of the frequency down signal D1 when the transmitted data indicates a space, and a logic H level of the frequency up signal U1 when the transmitted data indicates a mark.

When |fL−fc|≦f1, both the voltage comparators 71 and 72 output the logic L levels and the in-phase/antiphase judging circuit 13a makes the change amount signal C a logic L level and outputs a logic L level of the frequency down signal D1 and a logic L level of the frequency up signal U1. The holding circuit 16a holds the frequency up signal U1, the frequency down signal D1, and the change amount signal C until the completion of generating the frequency change signal.

In this embodiment, the change amount signal C, the frequency up signal U1, and the frequency down signal D1 are outputted in parallel. However, these signals can be sent to the next stage of circuit in a serial signal or a code signal.

When the frequency change control circuit 14 outputs the frequency control signal indicative of the mode changing the local oscillation frequency, the frequency change signal generation circuit 16a outputs the frequency change signal. In this case, the frequency change signal generation circuit 16a generates the frequency change signal indicative of two levels of increasing the local frequency signal and two levels of decreasing the local frequency signal. That is, when the change amount signal is H and the frequency up signal U2 is H, the frequency change signal indicates that the local frequency signal is to be increased by a predetermined frequency Δf2 and when The change amount signal is H and the frequency down signal D2 is H, the frequency change signal indicates that the local frequency signal is to be decreased by the predetermined frequency Δf2. When the change amount signal is L and the frequency up signal U2 is H, the frequency change signal indicates that the local frequency signal is to be increased by a predetermined frequency Δf1 and when the change amount signal is L and the frequency down signal D2 is H, the frequency change signal indicates that the local frequency signal is to be decreased by the predetermined frequency Δf1. Both frequency up and frequency down signals are L, the local frequency is not changed.

As mentioned, according to this embodiment, the change amount of the local oscillation frequency can be set to two values wherein Δf2>Δf1, so that the local oscillation frequency can be controlled in accordance with the difference between the carrier frequency and the local frequency, so that the local oscillation frequency can be controlled within the allowed frequency range by a fewer frequency controlling operations than the case of the first embodiment. Particularly, this is applicable in the case that a margin in the frequency difference between the local oscillation frequency and the carrier frequency is small.

In this embodiment, two reference voltages and two levels of frequency change amount are provided. However, more than two reference voltages and two levels of frequency change amount can be also provided.

As mentioned above, in the FSK receiver capable of the intermittent operation, when the frequency of the I or Q signal exceeds a reference frequency, the local oscillation frequency is controlled in the direction to reduce the frequency difference in accordance of the decoded signal, namely, the mark or the space after or before the intermittent receiving operation by changing a predetermined frequency amount Δf in order to suppress the frequency difference between the local oscillation frequency and the carrier frequency within the allowed range, so that decrease in the accuracy in the decoding operation can be prevented. Moreover, the frequency frequency fs is set within the allowed frequency difference range and the change amount of the local oscillation frequency is set to the predetermined amount Δf which corresponds a frequency obtained by subtracting the frequency shift fd of the FSK signal from the reference frequency fs, so that the frequency difference between the local oscillation frequency and the carrier signal can be suppressed within the allowed frequency range by a fewer frequency controlling operations. Further, the local oscillation frequency is changed by the predetermined frequency Δf to control the frequency difference within the allowed frequency difference, so that the effect to the frequency controlling due to the conversion error in the frequency to voltage converter is small.

Moreover, the supply voltage Vcc2 is cut off when the results in the in-phase/antiphase judging circuit 13 or 13a have been determined until the next frequency controlling operation, so that the power consumption can be reduced. The power consumption in the automatic frequency is control circuit 9 or 9a is further reduced by the intermittent frequency controlling by detecting the selective calling signal or counting the intermittent operation of the receiving the data. That is, as a modification of the power supply control circuit, a second power supply control circuit 18a replaces the power supply control circuit 18. The second power supply control circuit 18a counts the intermittent signal and supplies the supply power Vcc2 at every intermittent operation to control the frequency of the local oscillation signal.

Hereinbelow will be described a fourth embodiment of this invention.

Figure 7:
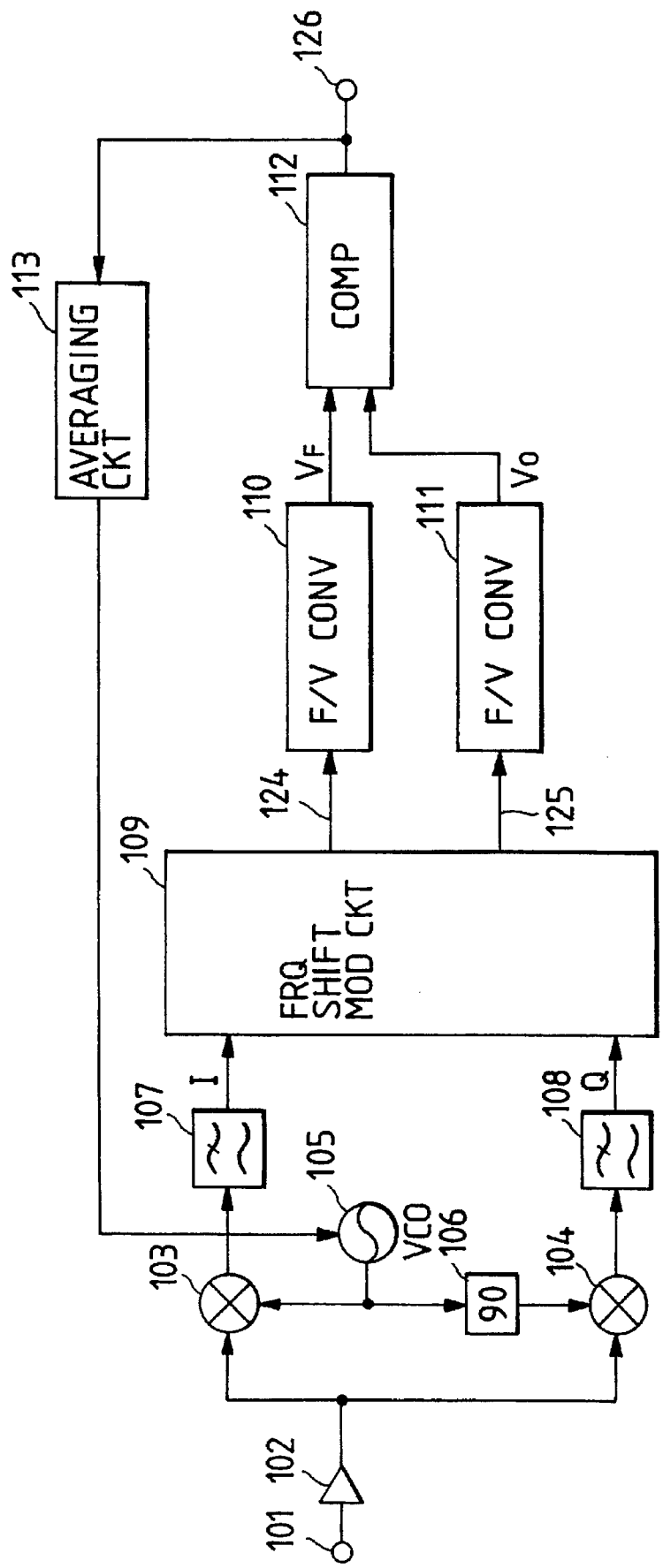
FIG. 7 is a block diagram of a fourth embodiment of an automatic frequency control apparatus used in an FSK receiver.

FIG. 7 is a block diagram of the fourth embodiment of an automatic frequency control apparatus used in an FSK receiver. The FSK receiver comprises a local oscillator 105 of a voltage controlled oscillator (VCO) for generating a local oscillation signal, a phase shifter 106 for phase shifting the local oscillation signal by π/2 and a mixer 103 for mixing the received FSK signal inputted through an amplifier 102 with the local oscillation signal and a mixer 104 for mixing the received FSK signal with an output of the phase shifter 106, a lowpass filter 107 for lowpass-filtering an output of the mixer 103 and outputting an in-phase signal, namely, I signal, a lowpass filter 108 for lowpass-filtering an output of the mixer 104 and outputting a quadrature signal, namely, Q signal, and a frequency shift modulation circuit 109 for effecting frequency shift modulation to the I and Q signals to produce a second FSK signal 124 having a frequency lower than the received FSK signal 101 and supplying a frequency signal 125 having a substantially predetermined frequency; a first frequency to voltage (F/V) converter 110 for frequency-converting the second FSK signal to a first voltage signal; a second frequency to voltage converter 111 for frequency-converting the frequency signal 125; a voltage comparator for comparing the first voltage signal with the second voltage signal; and an averaging circuit 113 for averaging the result of the comparator 112 and for supplying a frequency control signal supplied to the local oscillator 105.

Figure 8A:
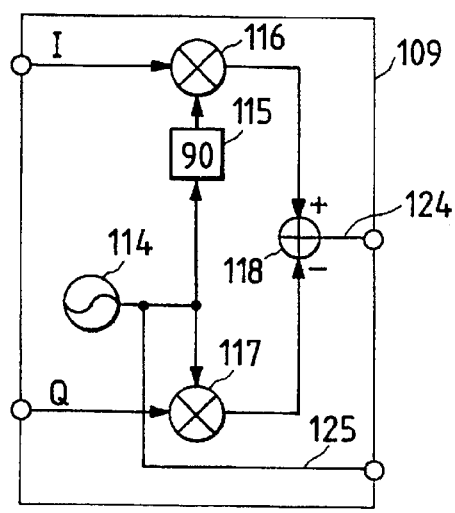
FIG. 8A is a block diagram of an example of the frequency shift modulation circuit 109 shown in FIG. 7.

FIG. 8A is a block diagram of an example of the frequency shift modulation circuit 109 shown in FIG. 7. The frequency shift modulation circuit 109 shown in FIG. 8A comprises: an oscillator 114 for generating the frequency signal having the substantially predetermined frequency, for example, 20 KHz, lower than the carrier frequency of the received FSK signal 101; a phase sifter for phase-shifting the frequency signal by 90°; a mixer 116 for mixing the I signal with an output the phase shifter 115; a mixer 117 for mixing the Q signal with the frequency signal; and a subtractor for obtaining a difference between the output of the mixer 116 and the mixer 117 to supply the second FSK signal 124.

Figure 8B:
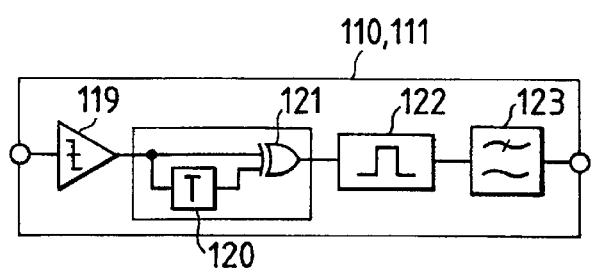
FIG. 8B is a block diagram of an example of the frequency converters shown in FIG. 7.

FIG. 8B is a block diagram of an example of the frequency converters 110 and 111 shown in FIG. 7. The frequency to voltage converter 110 or 111 comprises: an amplitude limiter 119 for amplitude-limiting a signal inputted thereto; and edge detection circuit having a delay circuit 120 for delaying an output of the amplitude-limiter 119 and an Exclusive-OR circuit for effecting an Exclusive-OR operation between the output of the amplitude limiter 119 and an output of the delay circuit 120; a pulse generator 122 responsive to an output of the edge detection circuit for generating a pulse having a predetermined duration; and a lowpass filter 123 for low-pass filtering and output of the pulse generator 122.

The operation of obtaining the I and Q signals by a receiving and detection circuit including the mixers 103 and 104 supplied with the local oscillation frequency and the phase shift frequency and the lowpass filters 107 and 108 are described in the first embodiment and the prior art. Therefore, this operation of obtaining I and Q signal are omitted.

The frequency shift modulation circuit 109 generates the second FSK signal 124 by modulating the I an Q signals with the frequency signal 124 having the predetermined frequency, for example, 20 kHz which is lower than the carrier frequency of the received FSK signal 101. Here, if the carrier frequency is 900 MHz for example, the local oscillator 105 generates the local oscillation signal of 900 MHz. The first frequency to voltage converter 110 converts a frequency of the second FSK signal 124 to a voltage VF. The frequency to voltage converter 111 converts the predetermined frequency of the frequency signal 125 to a voltage Vo. The voltage comparator 112 compares the voltage VF with the voltage signal Vo and supplies a voltage difference between the voltage VF and the voltage Vo to the averaging circuit 113. That is, when an instant frequency of the second FSK signal 12S equals to the frequency of the frequency signal 125, the comparator outputs 0 V and outputs a voltage signal showing a plus and minus value approximately proportional to the Frequency change of the second FSK signal 124. As the result, the comparator 112 supplies a demodulating result 126. The comparator comprises a differential amplifier for supplying a difference voltage between two inputs of the comparator 112.

Figure 9:
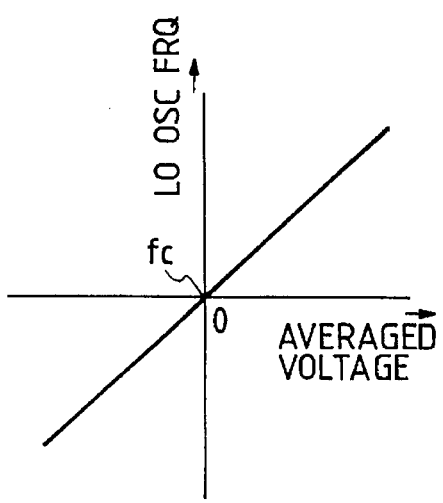
FIG. 9 is a graph of the fourth embodiment showing the relation between the local oscillation frequency and the averaged voltage.

The averaging circuit 113 averages the demodulating results and provides an average value over an interval sufficiently long in consideration of the data rate. If it is assumed that the data is transmitted randomly, the averaging value shows a voltage corresponding to the center frequency of the second FSK signal. The local oscillation frequency is controlled in the local oscillator as follows:

If the frequency of the local oscillation signal agrees with the carrier Frequency of the received FSK signal, the averaged voltage outputted by the averaging circuit 113 becomes 0 V. If there is a difference between the local oscillation Frequency and the carrier Frequency, the frequency difference corresponds to the averaged voltage. FIG. 9 is a graph of the fourth embodiment showing the relation between the local oscillation frequency and the averaged voltage. When the local oscillation frequency agrees with the carrier frequency fc the average voltage shows 0 V and the averaged voltage increases and decreases in accordance with an amount and polarity of the averaged voltage, so that when the local oscillation frequency is larger than the carrier frequency, the local oscillator 105 decreases the local oscillation frequency in accordance with the averaged voltage and when the local oscillation frequency is smaller than the carrier frequency, the local oscillator 105 increases the local oscillation frequency in accordance with the averaged voltage to agree the local oscillation frequency with the carrier frequency. Therefore, the automatic frequency controlling for FSK receiver is provided.

Figure 8C:
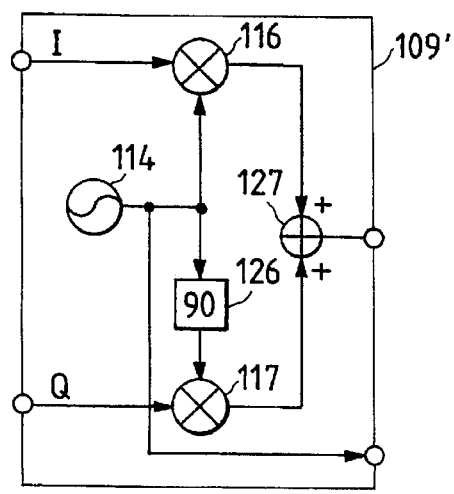
FIG. 8C is a block diagram of another example of the frequency shift modulation circuit shown in FIG. 7.

FIG. 8C is a block diagram of another example of the frequency shift modulation circuit shown in FIG. 7. In the frequency shift modulation circuit shown in FIG. 8C, a phase shifter is provided on the Q signal side, that is the mixer 117 mixes the Q signal with the 90° phase shifted frequency signal from the oscillator 114 and the mixer 116 mixes the I signal with the frequency signal from the oscillator 114 and outputs of the mixers 116 and 117 are added in place of the subtractor 118 shown in FIG. 8A. The frequency to voltage converters 110 and 111 also have various type of circuit configurations.

Figure 10:
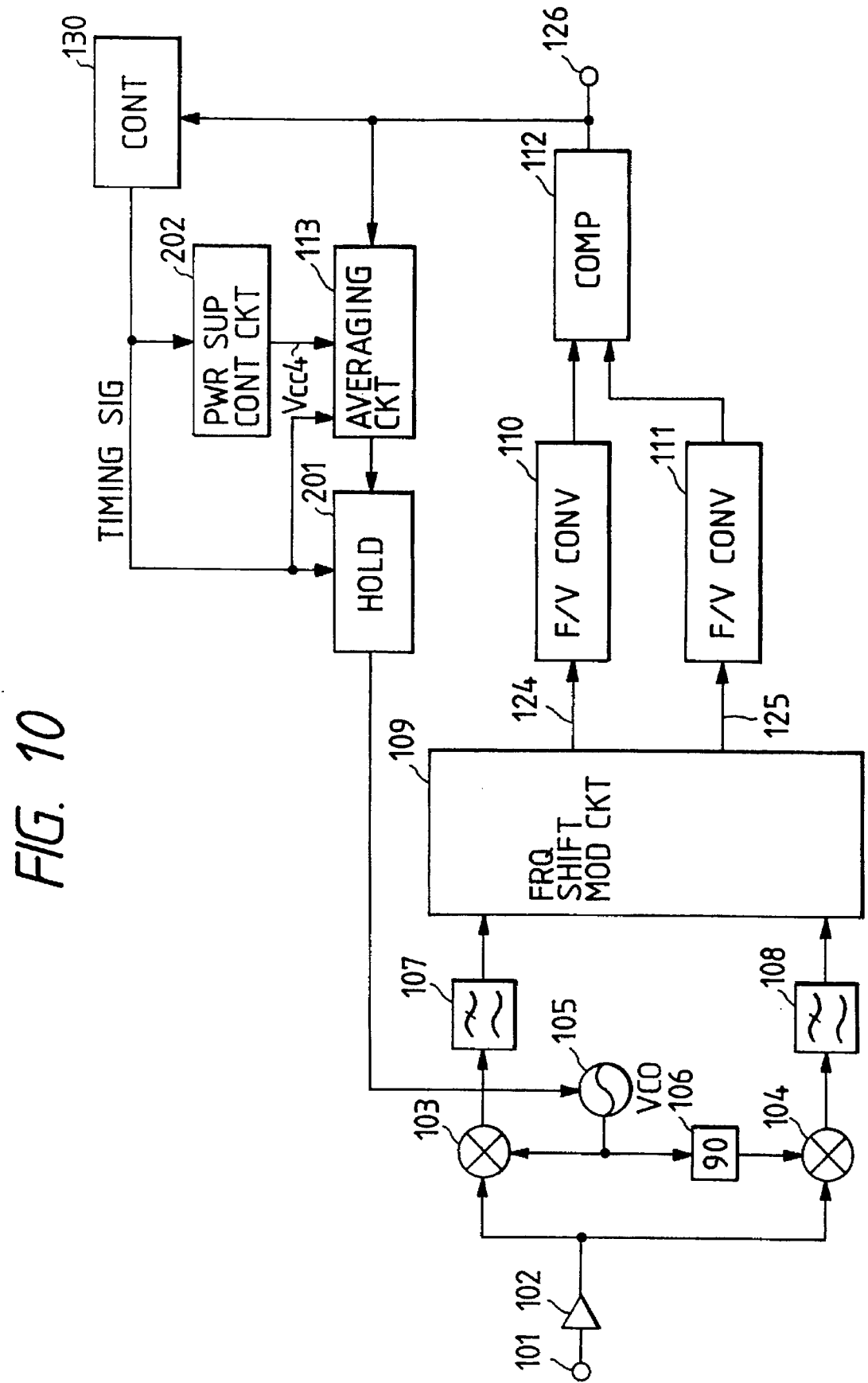
FIG. 10 is a block diagram of a fifth embodiment of an automatic frequency control apparatus used in an FSK receiver.

FIG. 10 is a block diagram of a fifth embodiment of an automatic frequency control apparatus used in an FSK receiver.

The automatic frequency control apparatus of the fifth embodiment has substantially the same structure as the fourth embodiment. The difference between the fifth embodiment and the fourth embodiment is that an averaging period detection circuit 130 for detecting an averaging period from the demodulated result 126, a holding circuit for holding the output of the averaging circuit 113 in response to an output of the averaging period detection circuit 130, and a supply power control circuit 202 for controlling of supplying a supply power Vcc4 to the averaging circuit 113.

Figure 11:
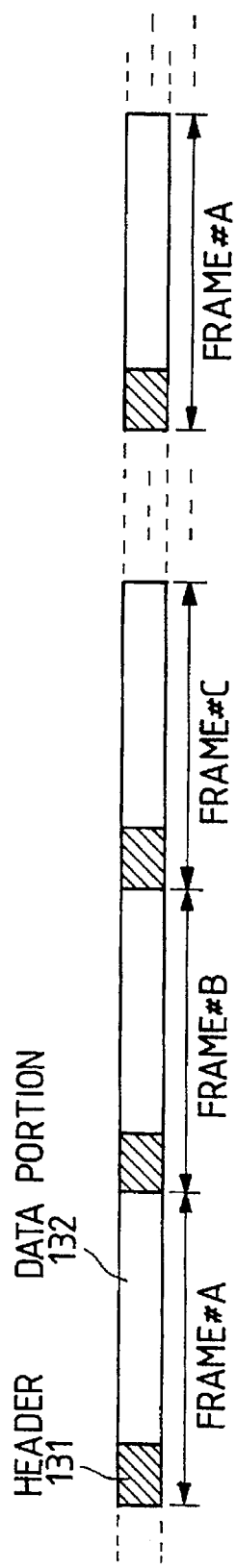
FIG. 11 is an illustration of the fifth embodiment showing an example of a general format of the received FSK signal.

FIG. 11 is an illustration of the fifth embodiment showing an example of a general format of the received FSK signal. Generally, in the intermittent receiving operation system of the FSK receiver, a frame to be received is transmitted every predetermined number of frames. The frame includes a header 131 and a data portion 132.

Figure 12:
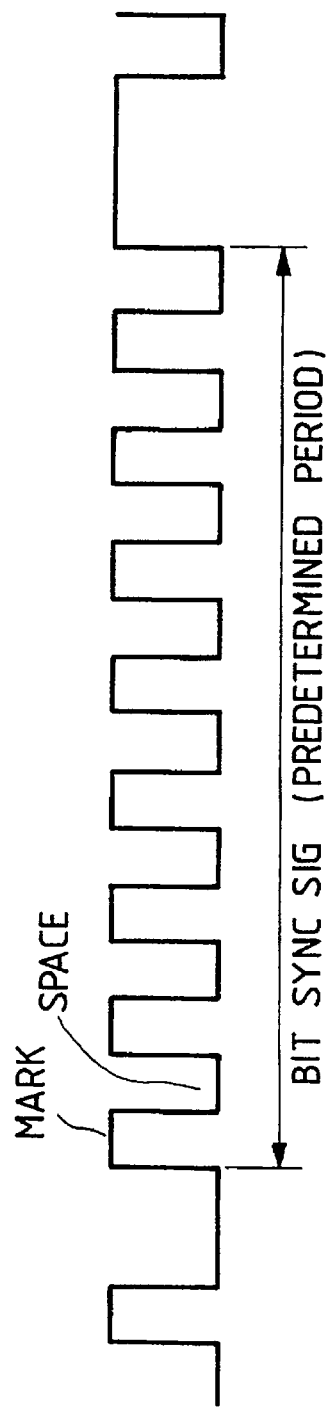
FIG. 12 is an illustration of the fifth embodiment showing a bit synchronizing signal.

FIG. 12 is an illustration of the fifth embodiment showing a bit synchronizing signal. The header 131 includes the bit synchronizing signal including a bit train having marks and spaces are alternately transmitted. Therefore, once the averaging period detection circuit 130 detects the frame to be received, then, it can determine the averaging period, that is, the period of the bit synchronizing signal transmitted. At the initial condition, the averaging is effected for a sufficiently long period in consideration of the data rate of the received FSK signal to obtain the average voltage.

The averaging circuit 113 averages the result of the comparing circuit 112 for the predetermined period of the frame of the periodically transmitted FSK signal in response to the output of the averaging period detection circuit 130. The supply power control circuit 202 supplies a supply power Vcc4 to the averaging circuit such that a start up interval for the averaging circuit is provided before the predetermined period. Then, the holding circuit 201 holds the output of the averaging circuit 113. The averaging circuit 113 is not supplied with the supply voltage Vcc4 until the next intermittent operation to reduce a power consumption.

As mentioned above, in this embodiment the averaging of the results of the comparing circuit 112 is effected for the predetermined period where the marks and spaces are transmitted alternately, so that averaging is more accurate and the automatic frequency control is effected accurately.

In this embodiment, the bit synchronizing signal is used for averaging period. However, other periods where the averaging of the results of the comparing circuit 112 corresponds to the center frequency of the second FSK signal 124 can be also used. Therefore, if the received FSK signal may be a multi-value signal, the averaging can be effected. In that case, a data train including a maximum positive frequency shift symbols and maximum negative frequency shift symbols alternately can be used. The predetermined period detection circuit may comprises a microprocessor.

Figure 13:
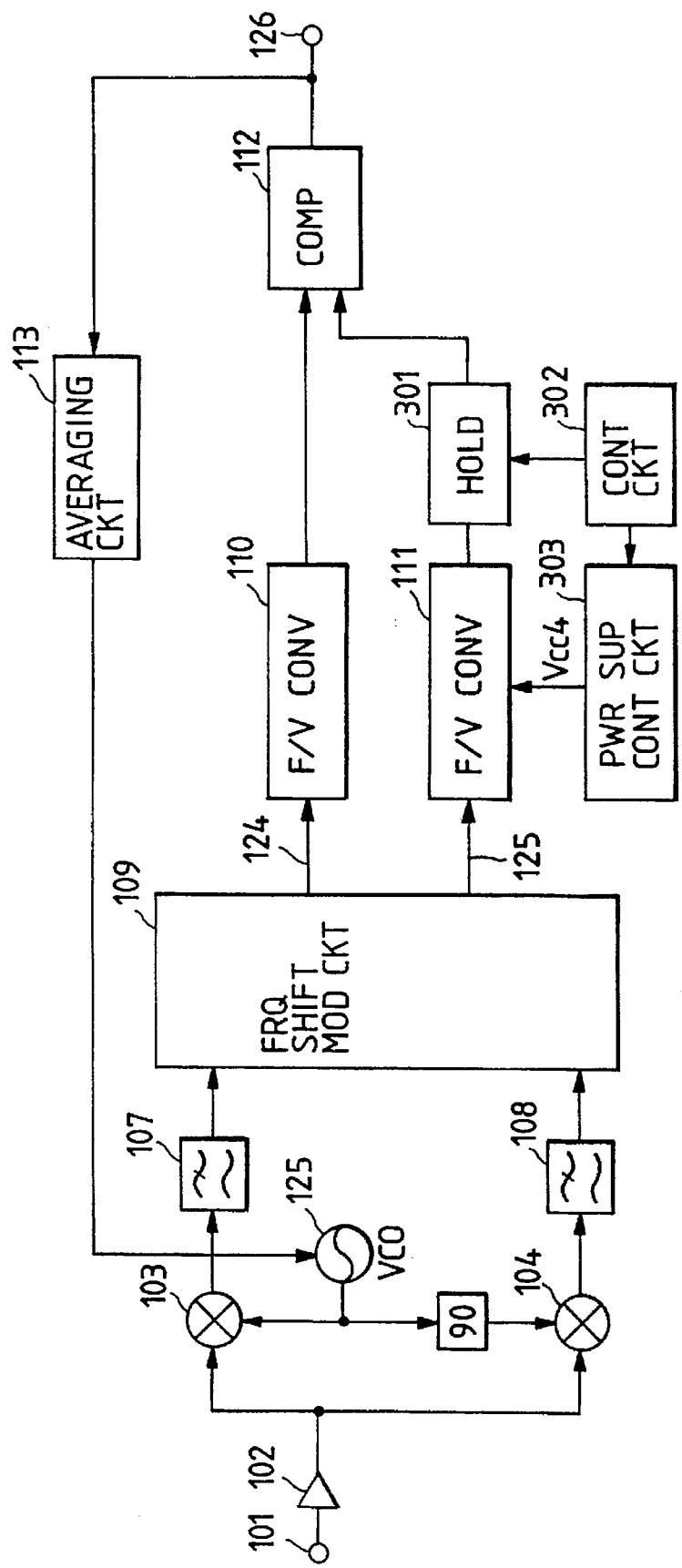
FIG. 13 is a block diagram of a sixth embodiment showing an automatic frequency control apparatus used in an FSK receiver.

FIG. 13 is a block diagram of a sixth embodiment showing an automatic frequency control apparatus used in an FSK receiver.

The automatic frequency control apparatus of the sixth embodiment has substantially the same structure as the fourth embodiment. The difference between the sixth embodiment and the fourth embodiment is that a holding circuit 301 for holding the output of the frequency to voltage converter 111, a control circuit for generating a holding control signal every predetermined interval, a supply power control circuit 303 for supplying a supply power Vcc4 to the frequency to voltage converter 111 in response to the control circuit 302. The control circuit 302 controls the supply power control circuit 303 to supply the supply power every predetermined interval to reduce a power consumption in the frequency to voltage converter 111 and then, after a start up interval of the frequency to voltage converter 111 the control circuit supplies the holding control signal to the holding circuit 301 to hold the output of the frequency to voltage converter 111. Therefore, the supplying the supply power is cut off except for obtaining the output of the frequency to voltage converter periodically, so that the power consumption in the frequency to voltage converter 111 is reduced. The predetermined interval is determined in consideration of the change in frequency of the frequency signal 125 due to a temperature variation and other variation factors to prevent a large deviation of the frequency of the frequency signal 125.

Figure 14:
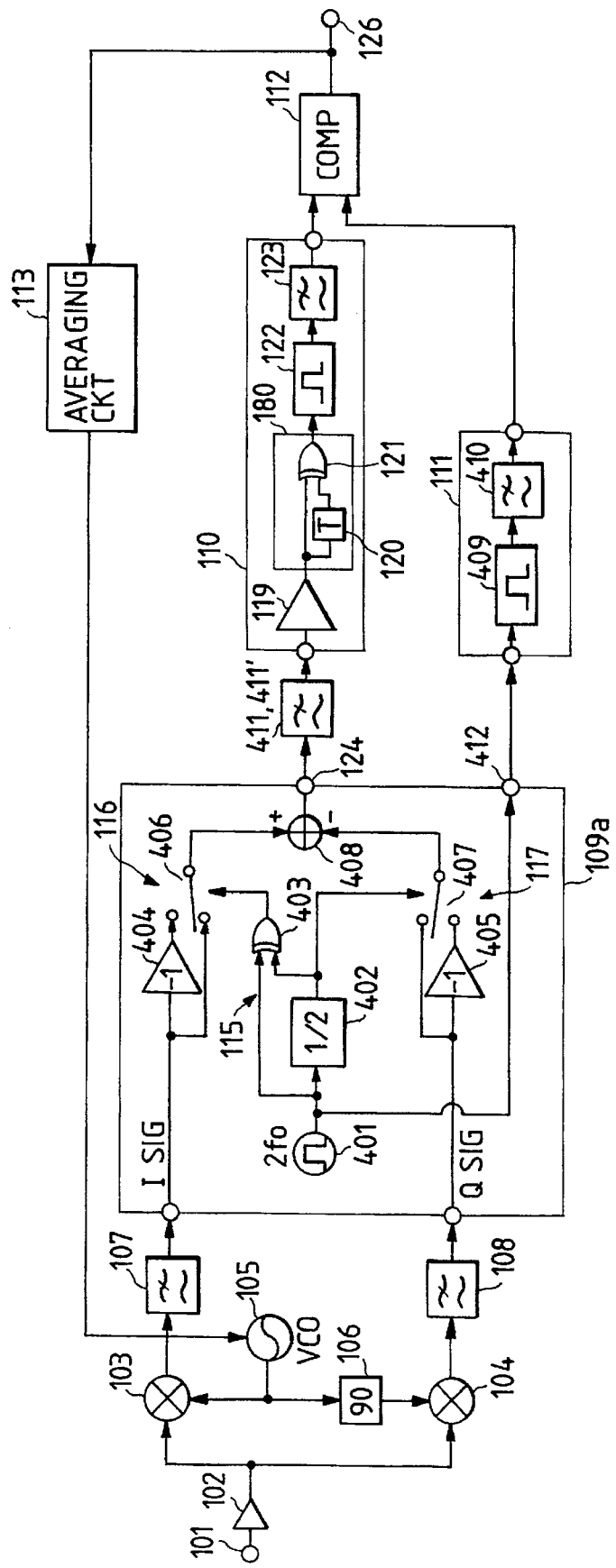
FIG. 14 is a block diagram of a seventh embodiment showing an automatic frequency control apparatus used in an FSK receiver.

FIG. 14 is a block diagram of a seventh embodiment showing an automatic frequency control apparatus used in an FSK receiver.

The automatic frequency control apparatus of the seventh embodiment has substantially the same structure as the fourth embodiment. The difference between the sixth embodiment and the fourth embodiment is in the frequency shift modulation circuit 109a. The frequency shift modulation circuit 109a comprises a digital oscillator 401 for generating a digital frequency signal 412 having a frequency twice the frequency signal 125; a ½-frequency divider 402 for ½-frequency dividing the digital frequency signal 412; an Exclusive OR circuit 408 for effecting an Exclusive OR operation between the digital frequency signal 412 and an output of the ½-frequency divider 402; an inverter 404 for inverting the I signal; an inverter 405 for inverting the Q signal; a switch 406 for outputting the I signal or the inverted I signal in accordance with an output of the Exclusive OR circuit 403; a switch 407 for outputting the inverted Q signal or the Q signal in accordance with an output of the ½-frequency divider 402; and a subtractor for subtracting an output of the switch 407 from an output of the switch 406. The inverter 404 and the switch 406 correspond to the mixer 116 and the inverter 405 and the switch 407 correspond to the mixer 117. The digital oscillator 401 and the ½-frequency divider 402 correspond to the oscillator 114. The Exclusive OR circuit 403 corresponds to the phase shifter 115.

The frequency to voltage converter 110 comprises: an amplitude limiter 119 for amplitude-limiting a signal inputted thereto; and edge detection circuit 180 having a delay circuit 120 for delaying an output of the amplitude-limiter 119 and an Exclusive-OR circuit 121 for effecting an Exclusive-OR operation between the output of the amplitude limiter 119 and an output of the delay circuit 120; and a pulse generator 122 responsive to an output of the edge detection circuit 180 for generating a pulse having a predetermined duration; and a lowpass filter 123 for low-pass filtering and output of the pulse generator 122. The frequency to voltage converter 111 comprises: a pulse generation circuit for generating a pulse having a predetermined duration at a rising edge of an input signal thereto; and a lowpass filter 410 for integrating a pulse train from the pulse generator 409. Between the subtractor 408 and the frequency to voltage converter 110, a lowpass filter 411 is provided.

Figure 15:
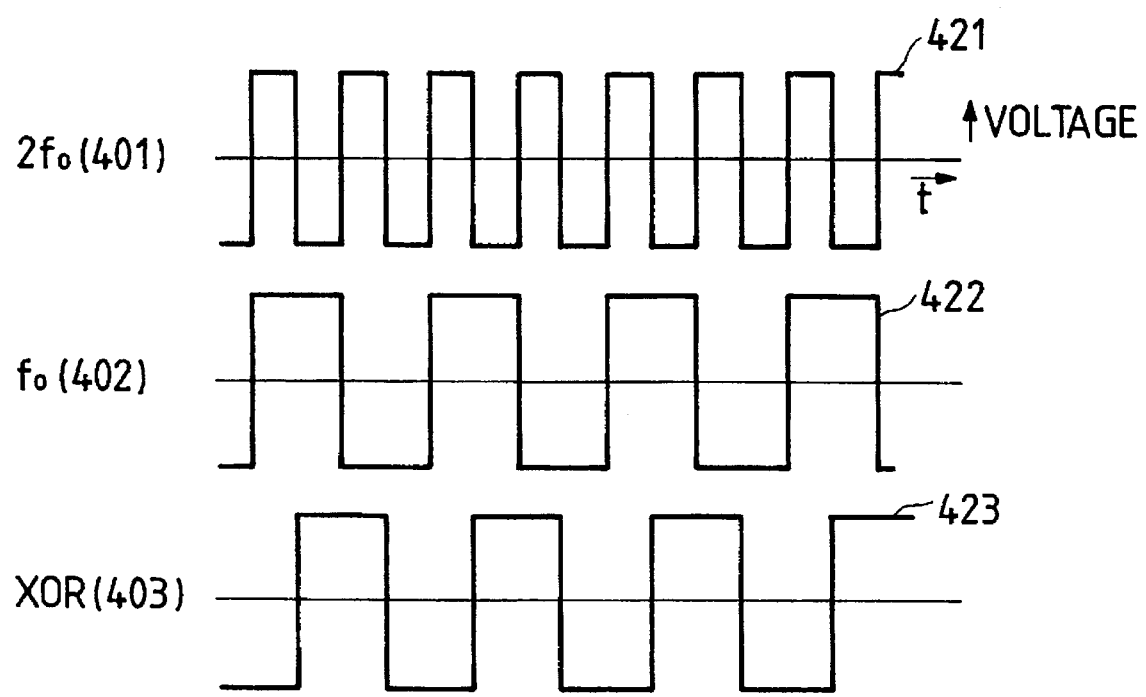
FIG. 15 is a time chart of the seventh embodiment illustrating waveforms shown in the frequency shift modulation circuit in FIG. 14.

FIG. 15 is a time chart of the seventh embodiment illustrating waveforms shown in the frequency shift modulation circuit 109a. The digital oscillator 401 generates the digital frequency signal having the predetermined frequency as shown by a waveform 421. The digital frequency signal is ½-frequency-divided as shown by a waveform 422. The divided frequency signal is supplied to the switch 407. The Exclusive OR circuit 403 effects Exclusive OR operation between the digital frequency signal and the divided frequency signal and supplies an Exclusive OR operation result as shown by a waveform 428 to the switch 406. As shown by waveforms 422 and 428, there is a 90° phase difference between the divided frequency signal supplied to the switch 407 and the Exclusive OR operation result, so that the switches 406 and 407 alternately output the I and Q signals and the inverted I and Q signals respectively with the 90° phase difference. The subtractor 408 obtains the difference between the outputs of the switches 406 and 407, so that the FSK signal 124' is provided equivalently from the digital frequency signal having the frequency twice the FSK signal 124. The FSK signal 124' is of a digital signal. Therefore, the lowpass filter 411 is provided for waveshaping by removing a high frequency component and supplies the waveshaped FSK signal to the frequency to voltage converter 110. On the other hand, the digital frequency signal 412 is supplied to the pulse generation circuit 409 which generates the pulse having a predetermined duration at a rising of the digital frequency signal 412 and the low pass filter 410 integrates the output of the pulse generation circuit 412 to effect the frequency to voltage conversion. The operation in the comparing circuit and the averaging circuit 113 to control the local oscillation frequency is the same as the embodiment shown in FIG. 7.

As mentioned above, according to this embodiment, the digital oscillator 401, ½-frequency divider 402, and the mixer 408 are of digital type, so that it is easy to implant the circuit configuration of the frequency shift modulation circuit in an integrated circuit. Moreover, in the frequency to voltage converter 111, the amplitude limiter 119 and the edge detector 120 and 121 are omitted, so that the number of parts for these circuit is reduced and the power consumption is reduced.

Moreover, the digital oscillator 401 may be replaced by a frequency divider for dividing a clock signal which is Frequently provided by a clock circuit for microprocessor which is commonly provided in the current electronic apparatus. Further, the lowpass filter 411 can be replaced with a bandpass filter for removing a dc component in addition to removing the high frequency component.

Figure 16:
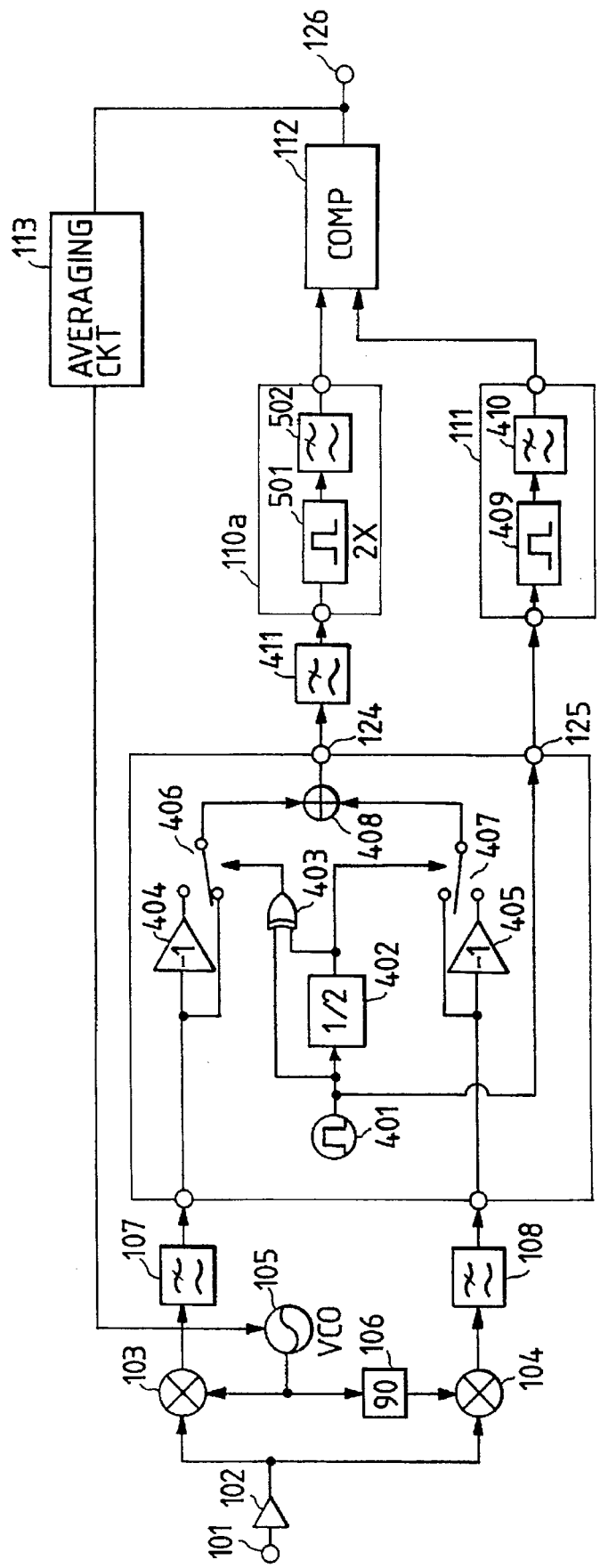
FIG. 16 is a block diagram of an eighth embodiment showing an automatic frequency control apparatus used in an FSK receiver.

FIG. 16 is a block diagram of an eighth embodiment showing an automatic frequency control apparatus used in an FSK receiver.

The automatic frequency control apparatus of the eighth embodiment has substantially the same structure as the fourth embodiment. The difference between the eighth embodiment and the seventh embodiment is in the frequency to voltage converter 110a. The frequency to voltage converter 110a comprises a pulse generation circuit 501 for generating a pulse having a duration twice the duration of the pulse generation circuit 409 at a rising edge of the input signal thereinto and a lowpass filter for integrating pulses from the pulse generation circuit 501.

The second FSK signal 124 lowpass-filtered by the lowpass filter 311 generates the pulse having a duration twice the duration of the pulse generation circuit 409 at only rising edge of the input signal thereinto. Then, the pulse is supplied to the lowpass filter to integrate pulses from the pulse generation circuit 501.

According to this embodiment, the number of pulses generated in the Frequency to voltage converter 110a is half of that in the frequency to voltage converter 110. However, the duration of the pulse is twice the duration of the pulse generation circuit 409, so that the integration result of the lowpass filter 502 is equivalent to the that of the frequency to voltage converter 110. Therefore, the amplitude limiter 119 and the edge detection circuit 180 shown in FIG. 14 can be omitted, so that a manufacturing cost of the FSK receiver and the power consumption can be reduced. Other operations are the same as the embodiment shown in FIG. 7.

Figure 17:
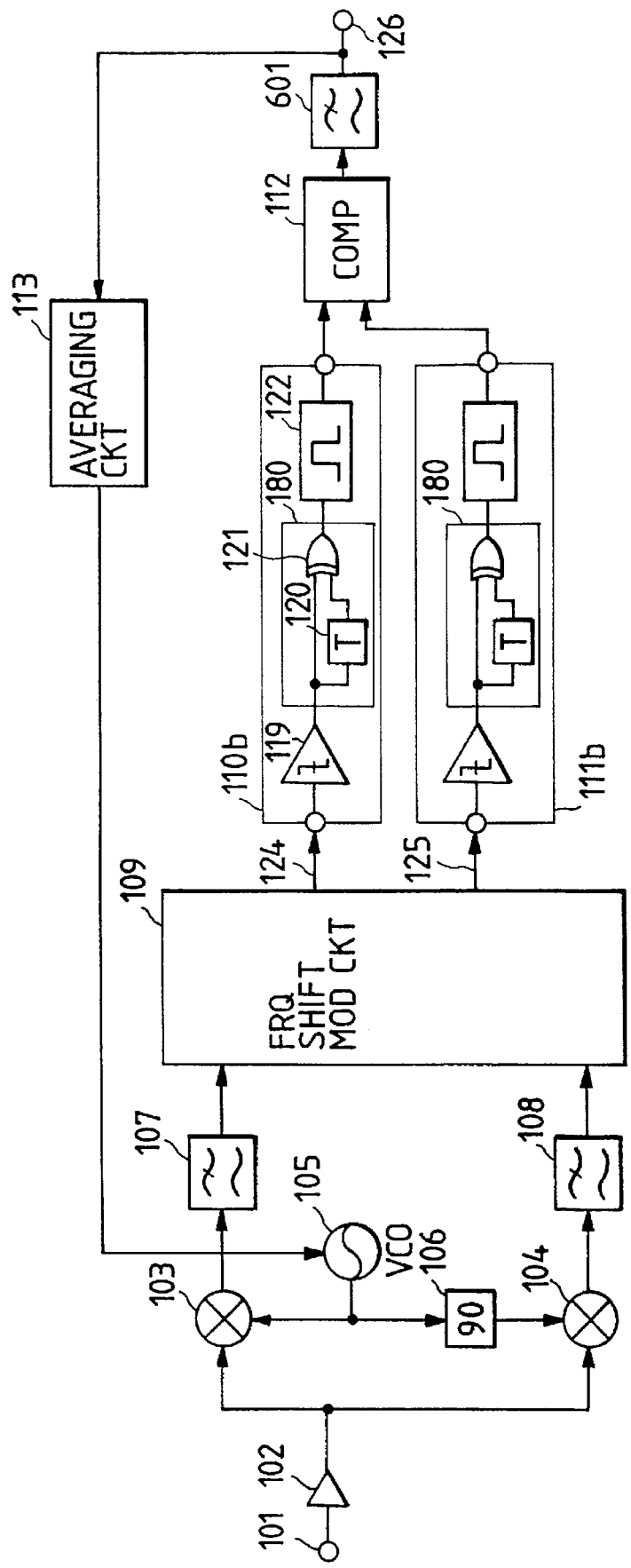
FIG. 17 is a block diagram of a ninth embodiment showing an automatic frequency control apparatus used in an FSK receiver.

FIG. 17 is a block diagram of a ninth embodiment showing an automatic frequency control apparatus used in an FSK receiver.

The automatic frequency control apparatus of the ninth embodiment has substantially the same structure as the fourth embodiment shown in FIG. 7. The difference between the ninth embodiment and the fourth embodiment is in the frequency to voltage converter and a lowpass filter 601 is further provided. The frequency to voltage converter 110b or 111b comprises: an amplitude limiter 119 for amplitude-limiting a signal inputted thereto; the edge detection circuit 180 having a delay circuit 120 for delaying an output of the amplitude-limiter 119 and an Exclusive-OR circuit for effecting an Exclusive-OR operation between the output of the amplitude limiter 119 and an output of the delay circuit 120; and a pulse generator 122 responsive to an output of the edge detection circuit for generating a pulse having a predetermined duration. That is, this frequency to voltage converter has the circuit structure such that two lowpass filters 123 are removed from the frequency to voltage converter 110 or 111 shown in FIG. 8B and one lowpass filter 601 is added. Therefore, operations except for the frequency to voltage converter 110b and the lowpass filter 601 are omitted.

The second FSK signal 124 from the frequency shift modulation circuit 109 is amplitude-limited by the amplitude limiter 119 and the edge detection circuit 180 detects rising and falling edges. The pulse generation circuit 122 generates a pulse having a predetermined duration in response to the edge detection circuit 180. Therefore, the pulse generation circuit 122 outputs a first pulse train signal having pulse rate corresponding to the second FSK signal. In the frequency to voltage converter 111b also outputs a second pulse train signal having a pulse rate corresponding to the digital oscillation signal 124. The comparing circuit 112 effects a subtraction between the first and second pulse train signals and supplies a third pulse train signal to the lowpass filter 601. The lowpass filter 601 integrating the third pulse trains signal and supplies a demodulation result 126. The automatic frequency controlling using the demodulation result 126 through the averaging circuit 113 is the same as the fourth embodiment.

As mentioned above, the number of lowpass filters for frequency converting operation, is reduced to one because two lowpass filters 123 are omitted and added one lowpass filter after the comparing circuit 112.

Figure 18:
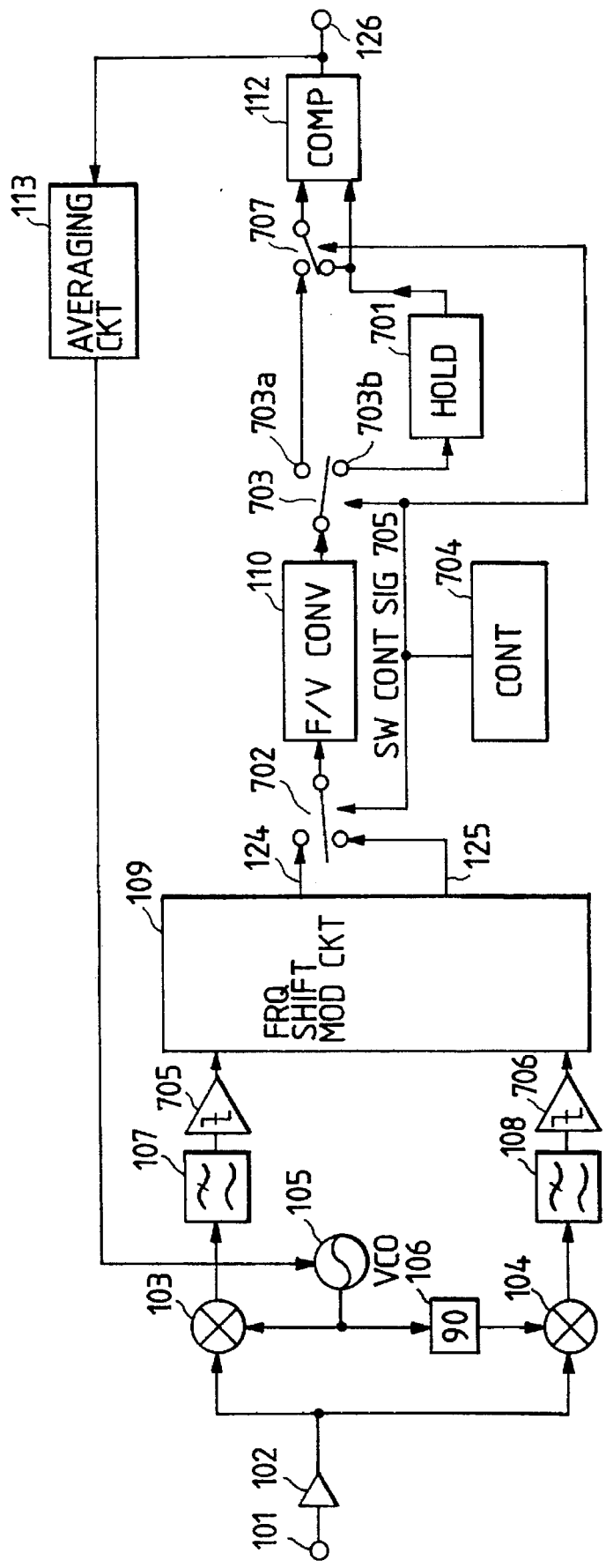
FIG. 18 is a block diagram of a tenth embodiment showing an automatic frequency control apparatus used in an FSK receiver.
Figure 19:
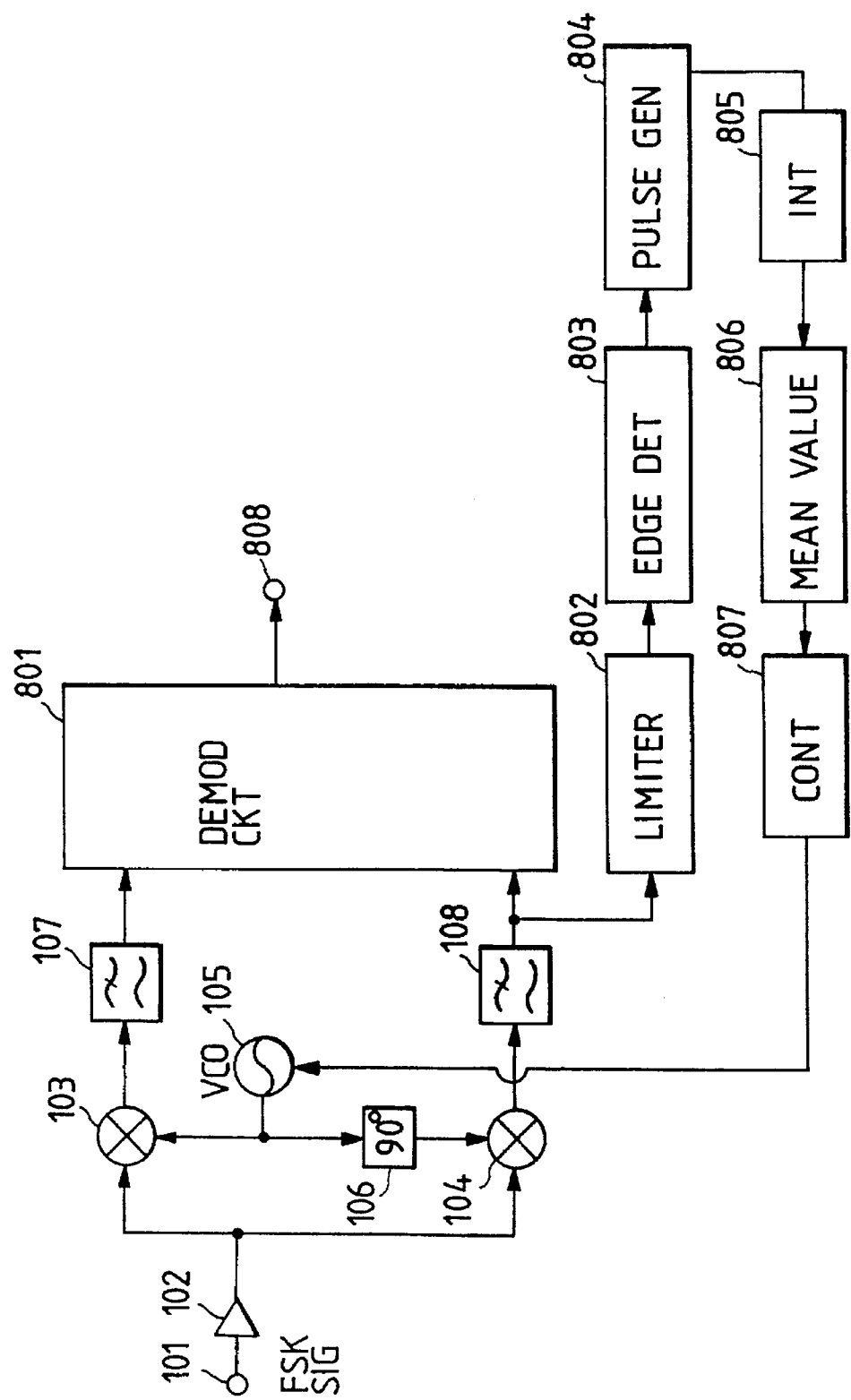
FIG. 19 is a block diagram of a prior art automatic frequency control apparatus.
Figure 20:
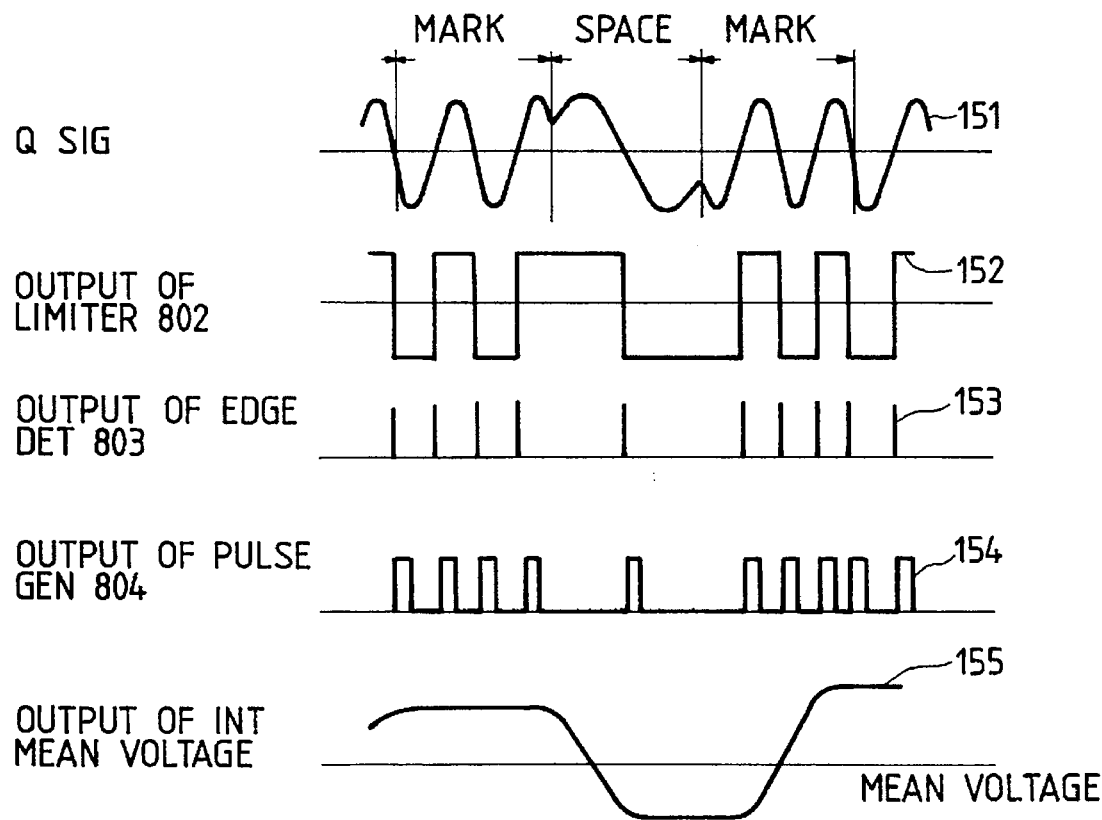
FIG. 20 shows waveforms of signals at respective points of the prior art automatic frequency control apparatus in FIG. 19.
Figure 21:
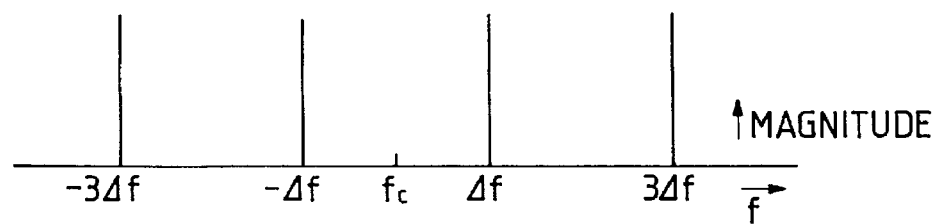
FIG. 21 is a spectrum diagram of the prior art showing a spectrum of a four-value FSK signal.

FIG. 18 is a block diagram of a tenth embodiment showing an automatic frequency control apparatus used in an FSK receiver.

The automatic frequency control apparatus of the tenth embodiment has substantially the same structure as the fourth embodiment shown in FIG. 7. The difference between the tenth embodiment and the fourth embodiment is in that the frequency to voltage converter 111 is removed and switches 702, 703, and 707, a holding circuit 701, and a control circuit 704 are added.

The control circuit 704 generates a switching control signal such that at first the frequency converter 110 converts the frequency signal 125 supplied through the switch 702 into a first voltage signal and supplies the first voltage signal to the holding circuit 701 through a terminal 703b of the switch 703. The holding circuit 701 holds a first voltage of the first voltage signal. In this condition, two inputs of the comparator 112, comprising a differential amplifier, are connected each other, so that the comparator 112 outputs 0 V. Then, the control circuit 704 generates the switching control signal such that the second FSK signal 124 supplied through the switch 702 is converted into a second voltage signal and supplies the second voltage signal to the comparing circuit 112 through a terminal 703a of the switch 703. In this condition, the switch 707 supplies the first and second voltage signals to two inputs of the comparator 112 respectively. The comparing circuit 112 comparing the second voltage signal from the second FSK signal 124 and the first voltage signal from the frequency signal 125 held by the holding circuit 701. The automatic frequency control operation using the demodulation result through the averaging circuit is similar to the fourth embodiment.

The control circuit 704 changes the switch connection through the switching control signal periodically. However, it is also possible to change the switch connection during a period for which unnecessary data for this FSK receiver is transmitted.

Limiters 705 and 706 are also provided between the lowpass filter 107 and the frequency shift modulation circuit 109 and the lowpass filter 108 and the frequency shift modulation circuit 109 respectively.

As mentioned above, the automatic frequency control in the FSK receiver receiving the FSK signal having a low modulation index is effected accurately because the second FSK signal is generated by frequency shift modulation of the I and Q baseband signals, obtained through direct conversion, using a low frequency signal having a predetermined frequency lower than the carrier frequency of the received FSK signal and then the frequency to voltage conversion is effected to the second FSK signal and the frequency signal. Further, in the multi-value FSK signal, if the symbols are arranged such that a center frequency agrees with the carrier frequency, this automatic frequency controlling can be effected. Moreover, this automatic frequency controlling can be provided by adding a small number of simple circuits to the conventional FSK receiver, so that a cost for manufacturing the FSK receiver is low and suppress increase in the power consumption.

What is claimed is:

1. An automatic frequency controlling circuit for a frequency shift keying receiver having a receiving and detection circuit for receiving and detecting an in-phase and quadrature signals using a frequency controlled local oscillation signal from a received frequency shift keying signal, a demodulator for demodulating said in-phase and quadrature signals and outputting mark and space data, and an intermittent signal circuit for generating an intermittent signal for an intermittent receiving operation of said frequency shift keying receiver, said automatic frequency controlling circuit comprising:

a local oscillator for generating said frequency controlled local oscillation signal;

a frequency to voltage converter for converting at least one signal of said in-phase and quadrature signals to a voltage signal;

a voltage comparator for comparing said voltage signal with a reference voltage;

a frequency deviation direction detection circuit for detecting whether a frequency deviation of said frequency controlled local oscillation signal from a carrier frequency of said received frequency shift keying signal is upwardly or downwardly in accordance with a result of said demodulator and an output of said voltage comparator to obtain a frequency deviation direction detection result;

a holding circuit for holding said frequency deviation direction detection result;

a frequency change control signal generation circuit for generating a frequency change control signal in response to said intermittent signal;

a frequency control signal generation circuit responsive to said frequency change control signal for generating a frequency control signal in accordance with an output of said holding circuit such that a frequency of said frequency controlled local oscillation signal is controlled toward said carrier frequency by a predetermined amount.

2. An automatic frequency controlling circuit as claimed in claim 1, wherein said frequency control signal generation circuit generates said frequency control signal such that said frequency is changed by said predetermined amount downwardly when said frequency deviation direction detection circuit detects that said frequency deviation is upward and upwardly when said frequency deviation detection circuit detects that said frequency deviation is downward.

3. An automatic frequency controlling circuit as claimed in claim 1, wherein said holding circuit at least holding said output of said frequency deviation direction detection circuit until said frequency control signal generation circuit generates said frequency control signal.

4. An automatic frequency controlling circuit as claimed in claim 1, further comprising a mixing circuit for mixing said in-phase signal and quadrature signal to generate a mixed signal and for supplying said mixed signal to said frequency to voltage comparator.

5. An automatic frequency controlling circuit as claimed in claim 1, wherein said frequency control signal generation circuit generates said frequency control signal such that said frequency is changed by said predetermined amount which is less than 2|fs−fd| wherein fs is a frequency of said mixed signal corresponding to the reference voltage and said fd is a frequency shift of said frequency shift keying signal.

6. An automatic frequency controlling circuit as claimed in claim 1, wherein said frequency change control signal generation circuit generates said frequency control signal just after said intermittent receiving operation in response to said intermittent signal.

7. An automatic frequency controlling circuit as claimed in claim 1, further comprising a power supply control circuit responsive to said intermittent signal and an output of the frequency deviation direction detection circuit for controlling a power supply to said frequency deviation direction detection circuit from when said output of the frequency deviation direction detection circuit is supplied thereto to the next intermittent receiving operation.

8. An automatic frequency controlling circuit as claimed in claim 1, wherein said received frequency shift keying signal selectively includes identifing data indicative of this frequency shift keying receiver, further comprising a detection circuit for detecting said identifying data from the mark and space data and a power supply control circuit responsive to said detection circuit for supplying a supply power to said automatic frequency controlling circuit when said detection circuit detects said identifying data.

9. An automatic frequency controlling circuit as claimed in claim 1, further comprising a detection circuit for detecting whether or not the number of said intermittent receiving operation reaches a predetermined number and a power supply control circuit responsive to an output of said detection circuit for supplying a power supply used for said automatic frequency controlling circuit every time the number of said intermittent receiving operation reaches said predetermined number.

10. An automatic frequency controlling circuit as claimed in claim 1, wherein said local oscillator comprising a phase synchronizing loop oscillation circuit, having a reference frequency signal generation circuit, for generating said frequency controlled local oscillation signal, said frequency of said local oscillation signal being controlled in accordance with a reference frequency signal which is controlled by said frequency control signal.

11. An automatic frequency controlling circuit as claimed in claim 1, wherein said local oscillator comprising a crystal oscillator for generating said frequency controlled local oscillation signal, said frequency of said frequency controlled local oscillation signal being controlled in accordance with said frequency control signal.

12. An automatic frequency controlling circuit as claimed in claim 1, further comprising:

a second voltage comparator for comparing said voltage signal with a second reference voltage which is different from said reference voltage, wherein said frequency deviation direction detection circuit further detects an amount of said frequency deviation of said frequency controlled local oscillation signal from said carrier frequency and said holding circuit further holds a detected amount of said frequency deviation and said frequency control signal generation circuit generates said frequency control signal in accordance with said frequency deviation direction detection result and said detected amount of said frequency deviation.

13. A frequency shift keying signal receiver with automatic frequency controlling, having a receiving and detection circuit for receiving and detecting an in-phase and quadrature signals using a local oscillation signal from a received first frequency shift keying signal having a data rate, for outputting a demodulated result, said frequency shift keying receiver comprising:

a frequency controlled local oscillator for generating said local oscillation signal, a frequency of said local oscillation signal being controlled in accordance with a frequency control signal;

a frequency shift keying modulation circuit for generating a frequency signal and a second frequency shift keying modulation signal by frequency shift modulating said in-phase and quadrature signals using said frequency signal having a substantially predetermined frequency lower than a carrier frequency of said first frequency shift keying signal;

a first frequency to voltage converter for converting a frequency of said second frequency shift keying modulation signal into a first voltage signal;

a second frequency to voltage converter for converting said substantially predetermined frequency of said frequency signal into a second voltage signal;

a voltage comparing circuit for comparing first and second voltage signals and outputting said demodulation result; and an averaging circuit for averaging said demodulation is result successively outputted for a predetermined interval which is sufficiently long compared with said data rate and for generating said frequency control signal.

14. A frequency shift keying signal receiver as claimed in claim 13, wherein said frequency shift keying modulation circuit comprises:

a second local oscillator for generating and outputting said frequency signal;

a phase shifter for phase sifting said frequency signal by 90°;

a first mixer for mixing said in-phase baseband signal with an output of said phase shifter;

a second mixer for mixing said quadrature baseband signal with said frequency signal; and a subtractor for generating and outputting said second frequency shift keying modulation signal by effecting subtraction between outputs of said first and second mixers.

15. A frequency shift keying signal receiver as claimed in claim 13, wherein said first frequency to voltage converter comprises:

a limiter circuit for amplitude-limiting said second frequency shift keying modulation signal;

an edge detection circuit for detecting rising and is falling edges in an output of said limiter circuit;

pulse generation circuit for generating a pulse in response to said edge detection circuit and generating a pulse train by successively supplying said pulse; and an integrating circuit for integrating said pulse train with a predetermined time constant.

16. A frequency shift keying signal receiver as claimed in claim 13, wherein said second frequency to voltage converter comprises:

a limiter circuit for amplitude-limiting said frequency signal;

an edge detection circuit for detecting rising and falling edges in an output of said limiter circuit;

pulse generation circuit for generating a pulse in response to said edge detection circuit and generating a pulse train by successively supplying said pulse; and an integrating circuit for integrating said pulse train with a predetermined time constant.

17. A frequency shift keying signal receiver as claimed in claim 13, wherein said first frequency shift keying signal periodically includes a data train having two values of make and space data alternately arranged, further comprising:

a control circuit for monitoring said demodulated signal and generating a timing signal indicative of a period of said data train included in said first frequency shift signal in accordance with a result of monitoring said demodulated signal, said averaging circuit averaging said demodulation result for said period in response to said timing signal; and a holding circuit for holding said frequency control signal in response to said timing signal and for supplying said held frequency control signal to said local oscillator.

18. A frequency shift keying signal receiver as claimed in claim 13, further comprising:

a power supply control circuit for controlling supplying of a supply power to said second frequency to voltage converter in response to a first control signal;

a holding circuit for holding said second voltage signal in response to a second control signal and for supplying a held second voltage to said voltage comparing circuit; and a control circuit for generating said first and second control signal periodically such that said power supply control circuit supplies said supply power to said second frequency to voltage converter to operate said second frequency to voltage converter to convert said substantially predetermined frequency of said frequency signal into said second voltage signal and then, said holding circuit holds said second voltage signal and then, said power supply control circuit cuts off said supply power.

19. A frequency shift keying signal receiver as claimed in claim 14, wherein said second local oscillator having a digital oscillator for generating a digital frequency signal having a second substantially predetermined frequency twice said substantially predetermined frequency of said frequency signal and a ½-frequency divider for ½-frequency dividing said digital frequency signal and said phase shifter having an Exclusive OR circuit for effecting Exclusive OR operation between said digital frequency signal and an output of said ½-frequency divider, said output of said Exclusive OR circuit being supplied to said first mixer and said ½-frequency divider, said digital frequency signal being supplied to said second mixer.

20. A frequency shift keying signal receiver as claimed in claim 19, further comprising a lowpass filter for supplying a lowpass-filtered second frequency shift keying signal to said first frequency to voltage converter.

21. A frequency shift keying signal receiver as claimed in claim 19, further comprising a bandpass filter for supplying a bandpass-filtered second frequency shift keying signal to said first frequency to voltage converter.

22. A frequency shift keying signal receiver as claimed in claim 19, wherein said first mixer comprises:

a first inverter for inverting said in-phase baseband signal; and a first switch for supplying either of said in-phase baseband signal or said inverted in-phase baseband signal to said subtractor in response to said output of said Exclusive OR circuit and said second mixer comprises:

a second inverter for inverting said quadrature baseband signal; and a second switch for supplying either of said quadrature baseband signal or said inverted quadrature baseband signal to said subtractor in response to said output of said ½-frequency divider.

23. A frequency shift keying signal receiver as claimed in claim 19, wherein said second local oscillator supplies said digital frequency signal as said frequency signal to said second frequency to voltage converter and said second frequency to voltage converter comprises a pulse generation circuit for generating a pulse signal having a predetermined duration at a rising edge of said digital frequency signal and a lowpass filter for lowpass-filtering and supplying said pulse signal to said voltage comparing circuit.

24. A frequency shift keying signal receiver as claimed in claim 23, wherein said first frequency to voltage converter comprises a pulse generation circuit for generating a second pulse signal having a second predetermined duration twice said predetermined duration at a rising edge of said second frequency shift keying signal and a lowpass filter for a lowpass-filtering and supplying said second pulse signal to said voltage comparing circuit.

25. A frequency shift keying signal receiver as claimed in claim 13, further comprising a low pass filter, wherein said first frequency to voltage converter comprises:

a first amplitude limiter for amplitude-limiting said second frequency shift modulation keying signal;

a first edge detection circuit for detecting rising and falling edges of said second frequency shift keying signal from said first amplitude limiter; and a first pulse generator for generating a first pulse having a first predetermined duration at a rising edge in an output of said first edge detection circuit, and said second frequency to voltage converter comprises:

a second amplitude limiter for amplitude-limiting said frequency signal;

a second edge detection circuit for detecting rising and falling edges of said frequency signal from said second amplitude limiter; and a second pulse generator for generating a second pulse having a second predetermined duration at a rising edge in an output of said second edge detection circuit, said voltage comparing circuit obtaining a difference between a first pulse train which is derived by successively supplied said first pulse and a second pulse train which is derived by successively supplied said second pulse, said lowpass filter integrating an output of said voltage comparing circuit to supply said demodulation result.

26. A frequency shift keying signal receiver with automatic frequency controlling, having a receiving and detection circuit for receiving and detecting an in-phase and quadrature signals using a local oscillation signal from a received first frequency shift keying signal having a data rate, for outputting a demodulated result, said frequency shift keying signal receiver comprises:

a local oscillator for generating said local oscillation signal, a frequency of said local signal being controlled in accordance with a frequency control signal;

a frequency shift keying modulation circuit for generating a frequency signal and a second frequency shift keying modulation signal by frequency shift modulating said in-phase and quadrature signals using said frequency signal having a predetermined frequency lower than a carrier frequency of said first frequency shift keying signal;

a first switch for outputting either said second frequency shift keying modulation signal or said frequency signal in response to a switch control signal;

a frequency to voltage converter for converting a frequency of an output of said first switch into a voltage signal;

a second switch for said voltage signal at a first terminal or a second terminal in response to said switch control signal;

a holding circuit for holding said voltage signal from said second terminal;

a voltage comparing circuit for comparing said voltage signal from said first terminal and said held voltage signal from said holding circuit and outputting a demodulation result;

a control circuit for generating said switch control signal such that when said first switch outputs said second frequency shift keying signal, said second switch outputs said voltage signal to said at said first terminal and when said first switch outputs said frequency signal, said second switch outputs said voltage signal at said second terminal and said first and second switches switch periodically; and an averaging circuit for averaging said demodulation result successively outputted for a predetermined interval which is sufficiently long compared with said data rate and for generating said frequency control signal.

27. An automatic frequency controlling circuit as claimed in claim 13, further comprising:

a first limiter circuit for amplitude-limiting said in-phase signal and supplying amplitude-limited in-phase signal to said frequency shift modulation circuit and a second limiter circuit for amplitude-limiting said quadrature signal and supplying amplitude-limited quadrature signal to said frequency shift modulation circuit.

28. An automatic frequency controlling circuit for a frequency shift keying receiver having a receiving and detection circuit for receiving and detecting an in-phase and quadrature signals using a frequency controlled local oscillation signal from a received first frequency shift keying signal having a data rate, and a demodulator for demodulating said in-phase and quadrature baseband signals and outputting mark and space data, said automatic frequency controlling circuit comprising:

a local oscillator for generating said frequency controlled local oscillation signal;

a frequency shift keying modulation circuit for generating a frequency signal and a second frequency shift keying modulation signal by frequency-shift-modulating said in-phase and quadrature signals using said frequency signal having a substantially predetermined frequency lower than a carrier frequency of said first frequency shift keying signal;

a first frequency to voltage converter for converting a frequency of said second frequency shift keying modulation signal into a first voltage signal;

a second frequency to voltage converter for converting said predetermined frequency of said frequency signal into a second voltage signal;

a voltage comparing circuit for comparing first and second voltage signals and outputting a demodulation result; and an averaging circuit for averaging said demodulation result successively outputted for a predetermined interval which is sufficiently long compared with said data rate and for generating said frequency control signal.

29. An automatic frequency controlling circuit as claimed in claim 28, wherein said first frequency shift keying signal periodically includes a data train having two values of make and space data alternately arranged, further comprising:

a control circuit for effecting monitoring of said demodulated signal and generating a timing signal indicative of a period of said data train included in said first frequency shift signal in accordance with said monitoring, said averaging circuit averaging said demodulation result for said period in response to said timing signal; and a holding circuit for holding said frequency control signal in response to said timing signal and for supplying said held frequency control signal to said local oscillator.

30. An automatic frequency controlling circuit as claimed in claim 28, wherein said frequency shift keying modulation circuit comprises:

a second local oscillator for generating and outputting said frequency signal;

a phase shifter for phase sifting said frequency signal by 90°;

a first mixer for mixing said in-phase baseband signal with an output of said phase shifter;

a second mixer for mixing said quadrature baseband signal with said frequency signal; and a subtractor for generating and outputting said second frequency shift keying modulation signal by effecting subtraction between outputs of said first and second mixers.

31. An automatic frequency controlling circuit as claimed in claim 30, wherein said second local oscillator having a digital oscillator for generating a digital frequency signal having a second substantially predetermined frequency twice a frequency of said frequency signal and a ½-frequency divider for ½-frequency dividing said digital frequency signal and said phase shifter having an Exclusive OR circuit for effecting Exclusive OR operation between said digital frequency signal and an output of said ½-frequency divider, said output of said Exclusive OR circuit being supplied to said first mixer and said ½-frequency divider being supplied to said second mixer.

\* \* \* \* \*